US009020858B2

(12) United States Patent
Jiang et al.

(10) Patent No.: US 9,020,858 B2
(45) Date of Patent: Apr. 28, 2015

(54) PRESENCE-OF-CARD CODE FOR OFFLINE PAYMENT PROCESSING SYSTEM

(75) Inventors: Fan Jiang, Adliswil (CH); Malgorzata Monika Lisowiec, Dubendorf (CH); Michael William Springer, Zürich (CH); Aneto Pablo Okonkwo, Zurich (CH); Patrick Pui Wah Leung, Paris (FR)

(73) Assignee: Google Inc., Mountain View, CA (US)

( * ) Notice: Subject to any disclaimer, the term of this patent is extended or adjusted under 35 U.S.C. 154(b) by 375 days.

(21) Appl. No.: 13/408,804

(22) Filed: Feb. 29, 2012

(65) Prior Publication Data
US 2013/0226796 A1    Aug. 29, 2013

(51) Int. Cl.
*G06Q 20/00*    (2012.01)

(52) U.S. Cl.
CPC ..................... *G06Q 20/00* (2013.01)

(58) Field of Classification Search
USPC ....................................... 705/50, 67
See application file for complete search history.

(56) References Cited

U.S. PATENT DOCUMENTS

| | | | |
|---|---|---|---|
| 6,070,795 A | 6/2000 | Feiken | |
| 6,327,578 B1 | 12/2001 | Linehan | |
| 6,427,912 B1 | 8/2002 | Levasseur | |
| 6,839,840 B1 | 1/2005 | Cooreman | |
| 7,721,955 B2 | 5/2010 | Harrison et al. | |
| 7,765,162 B2 | 7/2010 | Binder et al. | |
| 8,190,087 B2 | 5/2012 | Fisher et al. | |
| 8,290,433 B2 | 10/2012 | Fisher et al. | |
| 8,386,349 B2 * | 2/2013 | Dixon et al. | 705/35 |
| 2002/0133409 A1 | 9/2002 | Sawano et al. | |
| 2003/0097270 A1 | 5/2003 | Musselwhite et al. | |
| 2006/0018450 A1 * | 1/2006 | Sandberg-Diment | 379/93.12 |
| 2006/0047593 A1 | 3/2006 | Naratil et al. | |

(Continued)

FOREIGN PATENT DOCUMENTS

| | | |
|---|---|---|
| EP | 1 565 016 A3 | 8/2005 |
| JP | 06259452 | 9/1994 |

(Continued)

OTHER PUBLICATIONS

Bolton, H., Australian Office Action issued in Application No. 2012244201, pp. 1-4, Dec. 13, 2012.

(Continued)

*Primary Examiner* — Calvin L Hewitt, II
*Assistant Examiner* — Isidora Iluonakhamhe
(74) *Attorney, Agent, or Firm* — Johnson, Marcou & Isaacs, LLC

(57) ABSTRACT

Preventing fraud during an offline transaction by encoding a randomly-generated card verification code onto a smart card. The verification code is transmitted to a contactless device during each transaction, wherein it is cross-referenced with the account number to ensure presence of the card. Also, every transaction record is signed by an access key resident on the contactless device and certified by a signing key resident on a remote system. Funds may be deposited onto the card when the contactless device creates a deposit request, signs the request using an access key and transmits it to the remote system, which in turn processes the request and certifies it with a signing key. Funds may be withdrawn when the contactless device creates a withdrawal record and signs it using an access key. The remote system verifies the signatures and certifies the records using a signing key when the records are later transmitted.

18 Claims, 11 Drawing Sheets

(56) References Cited

U.S. PATENT DOCUMENTS

| | | | |
|---|---|---|---|
| 2007/0168260 A1 | 7/2007 | Cunescu et al. | |
| 2007/0278291 A1 | 12/2007 | Rans et al. | |
| 2008/0059374 A1 | 3/2008 | Gangi | |
| 2009/0143104 A1 | 6/2009 | Loh et al. | |
| 2009/0265260 A1* | 10/2009 | Aabye et al. | 705/30 |
| 2009/0265271 A1* | 10/2009 | Aabye et al. | 705/41 |
| 2010/0198728 A1 | 8/2010 | Aabye et al. | |
| 2010/0325269 A1 | 12/2010 | Kim et al. | |
| 2011/0226852 A1 | 9/2011 | Brennan | |
| 2014/0046784 A1* | 2/2014 | Prakash et al. | 705/17 |

FOREIGN PATENT DOCUMENTS

| | | |
|---|---|---|
| JP | 2006-259452 | 9/2006 |
| KR | 1020060016570 A1 | 8/2006 |
| KR | 10-2010-0138659 A | 12/2010 |
| KR | 10-2011-0004043 A | 1/2011 |
| WO | WO 98/52151 A1 | 11/1998 |
| WO | WO 01/09851 A1 | 2/2001 |
| WO | 2013083960 A1 | 6/2013 |
| WO | 2013109134 A1 | 7/2013 |

OTHER PUBLICATIONS

Geedipally, A., Australian Office Action issued in Application No. 2013202684, pp. 1-2, May 21, 2013.

Ggedipally, A., Australian Office Action issued in Application No. 2013205181, pp. 1-2, May 21, 2013.

Park, J. H., International Search Report and Written Opinion for International Patent Application No. PCT/US2012/061756 filed Oct. 24, 2012, pp. 1-10, Mar. 27, 2013.

U.S. Appl. No. 13/280,209 to Okonkwo et al., filed Oct. 24, 2011.

U.S. Appl. No. 13/280,231 to Springer et al., filed Oct. 24, 2011.

U.S. Appl. No. 13/408,794 to Springer et al., filed Feb. 29, 2012.

U.S. Appl. No. 13/408,813 to Jiang et al., filed Feb. 29, 2012.

U.S. Appl. No. 13/794,747 to Jiang et al., filed Mar. 11, 2013.

Oh, E.G., International Search Report and Written Opinion issued in International Application No. PCT/US2013/028466, pp. 1-24, Sep. 11, 2013.

Kim, "International Search Report and Written Opinion issued in International Appl. No. PCT/US2014/022856", Jul. 24, 2014, 1-12.

Stopp, "Office Action issued in copending U.S. Appl. No. 13/280,209, filed Oct. 24, 2011", Jul. 31, 2014, 1-15.

Stopp, "Office Action issued in copending U.S. Appl. No. 13/280,231, filed Oct. 24, 2011", Aug. 5, 2014, 1-13.

U.S. Appl. No. 14/226,785 to Jiang et al., filed Mar. 26, 2014.

U.S. Appl. No. 14/226,798 to Jiang et al., filed Mar. 26, 2014.

Bolton, H., Australian Office Action issued in Application No. 2012244201, pp. 1-4, Dec. 16, 2013.

Bolton, H., Australian Office Action issued in Application No. 2012244201, pp. 1-3, Jul. 2, 2013.

Iluonakhamhe, I., Office Action issued in copending U.S. Appl. No. 13/408,813, filed Feb. 29, 2012, pp. 1-12, Jun. 9, 2014.

Iluonakhamhe, I., Office Action issued in copending U.S. Appl. No. 13/408,794, filed Feb. 29, 2012, pp. 1-18, Mar. 18, 2014.

* cited by examiner

PRESENCE-OF-CARD CODE FOR OFFLINE PAYMENT PROCESSING SYSTEM

TECHNICAL FIELD

The present disclosure relates generally to near field communication (NFC) enabled smart cards and offline processing of purchases. More particularly, to methods and systems for preventing fraud during offline processing of purchases using NFC smart cards.

BACKGROUND

Near Field Communication (NFC) is a proximity communication technology that can enable contactless device payment technologies and that is supported by the Global System for Mobile Communications (GSM) Association. Radio frequency identification (RFID) is another wireless communication technology that can be adapted to enable NFC smart card payment technology. NFC communication generally is conducted in a range from about 3 to about 4 inches. Such short communication distances enable secure communication between close field proximity enabled devices. In operation of an NFC transaction, a user "taps" a device, such as an NFC-enabled mobile phone or NFC-enable smart card, to a reader. The reader recognizes the NFC-enabled device when the device is moved within range of the reader, establishes a secure communication channel with the device, and initiates a payment transaction between the reader and the device.

Smart cards are devices with an embedded integrated circuit (for example, a microprocessor and/or memory) for use as storage of data. Smart cards typically are credit card sized electronic devices that have a variety of uses and can be utilized in any transaction that involves the exchange of data or information. Smart card technology has been particularly useful in financial transaction systems. Smart cards generally do not include a data entry device for direct entry of data. Instead, a smart card is used in conjunction with a card reader and/or an input device. Traditionally, a smart card is linked to a financial account or contains financial account information. Consequently, when the smart card is used, the reader receives the financial account information and conducts a debit transaction from the financial account, requiring network access to process the on-line transaction. Such conventional smart cards are inoperable when access to a network or to specific computers on the network is not available.

Fraud is an ever-growing problem with the use of smart card technology. For instance, a malicious user may rollback the balance on a smart card to a previous saved state, thus removing withdrawal transactions occurring after the last saved state. Also, it may be difficult for the merchant or financial institution to verify that the actual cardholder is authorizing the smart card purchase. Because cards may be produced in bank card number (BIN) ranges, not randomly generated numbers, it is possible for an attacker to obtain one good card number and generate additional valid card numbers by changing the last digit(s) of the card number, thereby allowing an attacker to use someone else's card. Common methods to combat fraud include requiring submission of a copy of the physical card or of the three/four-digit card verification number (CCV). The CCV scheme, for instance, was established by credit card companies in efforts to reduce fraud for internet transactions. However, the CCV number is printed on the face or backside of the card and is limited by the number of possible three/four-digit combinations.

SUMMARY

In certain exemplary aspects, a method of preventing fraud for offline processing of purchases can include a contactless device that facilitates automatic, convenient, and secure communications with a smart card. Upon activation, a smart card is encoded with a card verification number that is randomly-generated by a remote system. The user taps the smart card in the contactless device's radio frequency field. The contactless device and the smart card establish a secure communication channel. Once a secure communication channel is established, the smart card transmits its card identification information, which comprises the card account number and the card verification number, and the transaction history to the contactless device. The contactless device may transmit this information to the remote system to confirm the identity of the smart card and analyze the transactions.

Every deposit and withdrawal record is signed by a session accession key resident on the contactless device. A session begins when a merchant signs into the contactless device and ends when the merchant signs out. An access key is may be a symmetric key, which is derived from a master key using a session identification number. The master key is maintained by the remote system and the access key is transmitted to the contactless device when a new session is begun.

The user may deposit funds onto the smart card using the contactless device, wherein a merchant operating the contactless device enters the deposit information onto the contactless device, creates a deposit request, signs the deposit request using an access key and transmits a request to the remote system. The transmitted request comprises the card identification information, the access key signature and the amount of the deposit. The remote system confirms the identity of the smart card, processes the request, certifies the request using a signing key and transmits a deposit record to the contactless device, which in turn transmits the deposit record to the smart card.

The user also may withdrawal funds from the smart card using a contactless device, wherein the contactless device confirms the identity of the smart card and determines whether the smart card has a sufficient balance available. The contactless device reads the current sum of deposits and the current sum of withdrawals from the smart card monotonic counter and compares these sums to the sums calculated using the transaction history. If these numbers match, the contactless device calculates the smart card balance by subtracting the sum of withdrawals from the sum of deposits. If the balance is a number greater than or equal to the current transaction cost, the transaction is authorized. If sufficient balance is available, the contactless device creates a withdrawal record and signs the record using an access key. The contactless device then transmits the signed withdrawal record to the smart card. The contactless device also stores the signed withdrawal record and the smart card transaction history until it has network access. At that time, it transmits the transaction history to the remote system. When the transaction records, together with the appropriate signatures, are transmitted to the remote system, the remote system verifies the signature to ensure the transaction records uploaded are genuine and certifies the record using a signing key. The remote system may also calculate the sum of all the transactions transmitted to verify that the quota is not exceeded or synchronize the transactions to identify missing records or errors.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
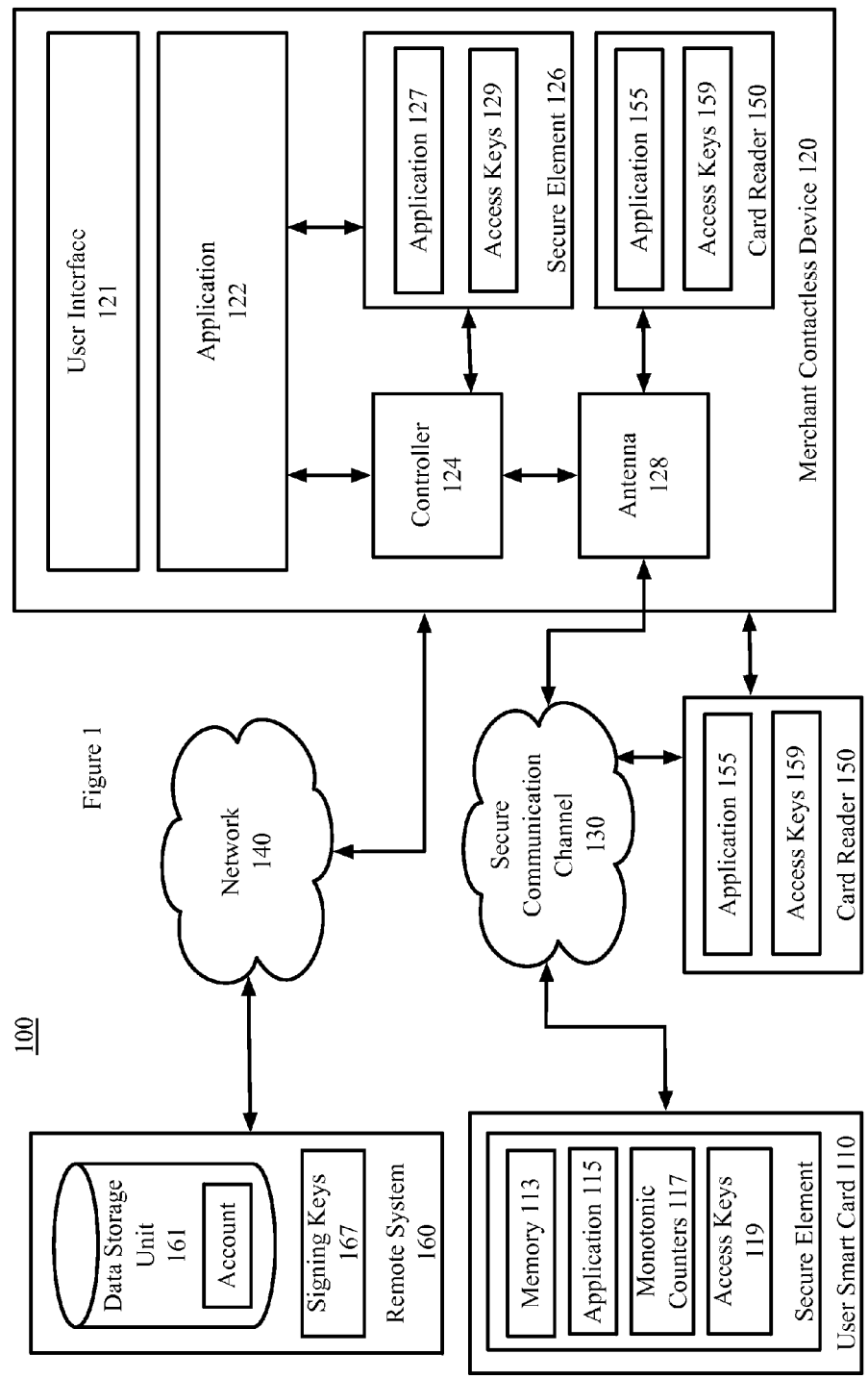
FIG. 1 is a block diagram depicting a system for processing an offline purchase initiated by a tap of a smart card with a contactless device and/or card reader according to an exemplary embodiment.

The exemplary embodiments provide methods and systems that enable users to prevent fraud while utilizing offline processing of purchases with a smart card and a contactless device/card reader. The user taps the smart card in the radio frequency field of the contactless device. The contactless device and the smart card establish a secure communication channel and the smart card transmits its card identification information to the contactless device. The card identification information comprises the card account number and the card verification number. If the contactless device has network access the card identification information is transmitted to the remote system for card verification by cross-referencing the card account number and the card verification number. If the contactless device is without network access, the contactless device verifies the identity of the smart card. If the smart card is new or inactive, the contactless device is prompted to register and activate the card. The activation of a new smart card occurs only when the contactless device has network access. The user may be prompted to create a new remote system account or to associate the smart card with an existing remote system account. Alternatively, the smart card may be activated without a remote system account. The remote system generates a random card verification number that becomes associated with the smart card and encoded in the card identification information. The remote system transmits the initial smart card data to the contactless device, which includes the card verification number, and the contactless device transmits the date to the smart card.

The user may deposit funds onto the smart card using the contactless device. The smart card transmits the transaction history to the contactless device, which is in turn transmitted to the remote system and stored in the card account. The remote system and/or contactless device may confirm the identity of the smart card by cross-referencing the card account number and the card verification number. In an exemplary online transaction, every deposit record is signed by the remote system using an asymmetric signing key before transmitting the record to the contactless device. A private key (for example, a teller signing key) is maintained by the remote system and a public key (for example, a teller access key) is transmitted to the contactless device. Therefore, a contactless device containing the public key can verify the authenticity of an online transaction record stored on the smart card using the public key, but it cannot manipulate an existing transaction record or issue a new deposit record without connecting to the server. A merchant operating the contactless device enters deposit information onto the contactless device, based on funds provided by a user of the smart card to the merchant. The contactless device creates and signs a deposit request with the teller access key, which is transmitted to the remote system. The remote system processes the request, verifies the identity of the smart card using the card verification number, certifies the deposit using the teller signing key and calculates a new sum of deposits. The remote system then transmits a deposit record to the contactless device. The contactless device transmits the deposit record to the smart card, and the secure communication channel is then terminated.

In an exemplary offline transaction, every withdrawal record is signed by a cashier session key. A session begins when a merchant signs into the contactless device and ends when the merchant signs out. Each session may be associated with a quota, such as a maximum number of transaction, a maximum time period or a maximum number of dollars. When the quota is reached, the merchant is required to connect to the remote system and request a new session access key. A cashier access key may be a symmetric key, which is derived from a master key using a session identification number. The master key is maintained by the remote system and the cashier access key is transmitted to the contactless device when a new session is begun. The user also may withdraw funds from the smart card using the contactless device. The smart card transmits the card identification information and transaction history to the contactless device. The contactless device confirms the identity of the smart card by cross-referencing the card account number and the card verification number. The merchant confirms whether the smart card has a sufficient balance available for a purchase transaction by using the contactless device to read the current sum of deposits and the current sum of withdrawals from the monotonic counters resident on the smart card. The contactless device compares the sums read from the monotonic counters to the sums calculated using the transaction history. If these numbers match, the contactless device then calculates the smart card balance by subtracting the sum of withdrawals from the sum of deposits. If the balance is a number greater than or equal to the current transaction cost, the transaction is authorized. If sufficient balance is available, the contactless device processes a debit transaction to debit the current transaction cost from the current sum of withdrawals. The contactless device creates a withdrawal record and then uses the cashier access key to sign the record. The contactless device writes the signed withdrawal record to the smart card and maintains a copy of the signed record for later transmission to the remote system. When the transaction records, together with the appropriate signatures, are later transmitted to the remote system, the remote system verifies the signature to ensure the transaction records uploaded are genuine and certifies the record using the cashier signing key. The remote system may also calculate the sum of all the transactions transmitted to verify that the quota is not exceeded or synchronize the transactions to identify missing records or errors.

The functionality of the exemplary embodiments will be explained in more detail in the following description, read in conjunction with the figures illustrating the program flow.

System Architecture

Turning now to the drawings, in which like numerals indicate like (but not necessarily identical) elements throughout the figures, exemplary embodiments are described in detail.

FIG. 1 is a block diagram depicting a system 100 for processing an offline purchase initiated by a tap of a smart card 110 with a contactless device 120, comprising a card reader 150, according to an exemplary embodiment. As depicted in FIG. 1, the exemplary operating environment 100 includes a merchant contactless device system 120 and a user smart card system 110 that are configured to communicate with one another via one or more secure communication channels 130. The exemplary operating environment 100 also includes a remote computer system 160 that is configured to communicate with the merchant contactless device system 120 via one or more networks 140.

In exemplary embodiments, the secure communication channel 130 can comprise communication via a close proximity communication protocol, such as near field communication (NFC), Bluetooth, or Wi-Fi, using appropriate protocols corresponding to those communication methods. In an alternative exemplary embodiment, the secure communication channel 130 can comprise a cellular network.

In an exemplary embodiment, NFC communication protocols include, but are not limited to ISO/IEC 14443 type A and/or B technology (hereafter "ISO 14443"), MIFARE technology (hereafter "MIFARE"), and/or ISO/IEC 18092 technology (hereafter "ISO 18092"). ISO 14443 is a communication protocol for contactless devices operating in close proximity with a reader. An ISO 14443 communication protocol is utilized for secure card payments, including but not limited to credit card payments, debit card payments, and other forms of financial card payments. MIFARE is a communication protocol for contactless devices that comply with proprietary device standards that are based on ISO 14443. A MIFARE protocol is utilized for stored function transactions, including but not limited to gift cards, transit cards, tickets, access cards, loyalty cards, and other forms of stored value card transactions. A MIFARE protocol may also be used for limited value-added services. ISO 18092 is a communication protocol for contactless devices operating at higher bit rates, allowing for richer communication between the devices. An ISO 18092 communication protocol is utilized for peer-to-peer communication, value-added services (including, but not limited to, coupons, loyalty cards, check-ins, membership cards, gift cards, and other forms of value-added services), and other forms of richer communication. Any suitable NFC communication protocol can be used for NFC communication between the smart card 110 and the contactless device 120 to implement the methods and functionality described herein.

In an exemplary embodiment, the contactless device system 120 can refer to a smart device that can communicate via an electronic, magnetic, or radio frequency field between the device 120 and another device, such as a smart card 110. In an exemplary embodiment, the contactless device 120 has processing capabilities, such as storage capacity/memory and one or more applications 122 that can perform a particular function. In an exemplary embodiment, the contactless device 120 contains an operating system (not illustrated) and user interface 121. Exemplary contactless devices 120 include smart phones; mobile phones; personal digital assistants (PDAs); mobile computing devices, such as netbooks, tablets, and iPads; laptops; and other devices, in each case having processing and user interface functionality.

The contactless device 120 also comprises a secure element 126, which can exist within a removable smart chip or a secure digital (SD) card or which can be embedded within a fixed chip on the device 120. In certain exemplary embodiments, Subscribed Identity Module (SIM) cards may be capable of hosting a secure element 126, for example, an NFC SIM Card. The secure element 126 allows a software application 122 resident on the device 120 and accessible by the device user to interact securely with certain functions within the secure element 126, while protecting information stored within the secure element. The secure element 126 comprises applications 127 running thereon that perform the functionality described herein.

The contactless device system 120 also comprises one or more access keys 129. In an exemplary embodiment, the access keys 159 may be defined as online transaction keys or offline transactions keys. An exemplary online transaction key is an asymmetric key, wherein the private key is stored on the remote system 160 and the private key is transmitted to the contactless device 120. In an alternative exemplary embodiment, the online transaction key may be a symmetric key. An exemplary offline transaction key is a symmetric key used to sign offline transactions. In an alternative exemplary embodiment, the offline transaction key is an asymmetric key. An offline transaction key is generated by the remote system 160 and transmitted to the contactless device 120 for each new session. Each session key can be used only by one contactless device 120 for the duration of a single session (for example, for the period of time from when the merchant signs onto a new session until the merchant signs out of the session). In addition, each session key may have a maximum number of transactions allowed per session key or a maximum time period allowed per session key. The session key may become invalid if the maximum is reached and the merchant may be required to start a new session, and thus receive a new session key.

Each session key is specifically provided by the remote system 160 for the type of session designated by the merchant (for example, for depositing funds or withdrawing funds onto a smart card 110). The method of transmitting an access key 129 to a smart card 110 is described in more detail hereinafter with reference to the methods described in FIG. 9. In an exemplary embodiment, the access key 159 is stored in the secure element 126 during the operation of the session. At the completion of each session, the access key 159 is wiped from the memory of the contactless device system 120.

An exemplary access key 159 is designated as a teller access key or a cashier access key. An exemplary teller access key is transmitted to the contactless device system 120 to assist in depositing funds onto a smart card 110. The teller access key will allow the merchant to read or write deposit transaction and to read withdrawal transactions. An exemplary cashier access key is transmitted to the contactless device system 120 to assist in withdrawing funds from a smart card 110. The cashier access key will allow the merchant to read deposit transaction and to read and write withdrawal transactions. In an exemplary embodiment, the access keys 159 are specific to each merchant session with the contactless device system 120 and are not readable, known or otherwise accessible to other merchant contactless device systems. Without an access key 159, the contactless device 120 cannot read or write transaction records onto the smart card 110. In an exemplary embodiment, the access keys 159 will define levels of access/permission to read and write data to the smart card 110.

In an exemplary embodiment, the contactless device 120 transmits a deposit or withdrawal record signed by the access key 159 residing on the contactless device 120 to the smart card 110. For example, during a deposit transaction, the contactless device 120 transmits a deposit record signed by the teller access key to the smart card 110 and during a withdrawal transaction, the contactless device 120 transmits a withdrawal record signed by the cashier access key to the smart card 110. In an exemplary embodiment, the remote system 160 maintains a record of which access key 159 is transmitted to every contactless device system 120. Therefore, the remote system 160 is capable of determining which merchant contactless device 120 signed each transaction and during which session the transaction was signed based upon the deposit/withdrawal records stored in the transaction history on the smart card 110. An exemplary access key 119 can be used to read and confirm that the remote system 160 has certified or verified a deposit or withdrawal.

The secure element 126 includes components typical of a smart card, such as crypto processors and random generators. In an exemplary embodiment, the secure element 126 comprises a Smart MX type NFC controller 124 in a highly secure system on a chip controlled by a smart card operating system, such as a JavaCard Open Platform (JCOP) operating system. In another exemplary embodiment, the secure element 126 is configured to include a non-EMV type contactless smart card, as an optional implementation.

The secure element 126 communicates with the controller 124 and the application 122 in the contactless device 120. In an exemplary embodiment, the secure element 126 is capable of storing encrypted user information and only allowing trusted applications to access the stored information. The controller 124 interacts with a secure key encrypted application 122 for decryption and installation in the secure element 126.

In an exemplary embodiment, the controller 124 is a Bluetooth link controller. The Bluetooth link controller may be capable of sending and receiving data, identifying the smart card 110, performing authentication and ciphering functions, and directing how the contactless device 120 will listen for transmissions from the smart card 110 or configure the contactless device 120 into various power-save modes according to the Bluetooth-specified procedures. In another exemplary embodiment, the controller 124 is a Wi-Fi controller or an NFC controller capable of performing similar functions.

The application 122 is a program, function, routine, applet or similar entity that exists on and performs its operations on a contactless device 120. For example, the application 122 may be one or more of an offline payment application, a digital wallet application, a coupon application, a loyalty card application, another value-added application, a user interface application, or other suitable application operating on the contactless device 120. Additionally, the secure element 126 also may comprise secure contactless software applications, such as an offline payment or other payment applications, secure forms of the applications 122, authentication applications, payment provisioning applications, or other suitable application using the secure functionality of the secure element.

The contactless device 120 communicates with the smart card 110 via an antenna 128. In an exemplary embodiment, once the contactless device application 122 has been activated and prioritized, the controller 124 is notified of the state of readiness of the contactless device 120 for a transaction. The controller 124 outputs through the antenna 128 a radio signal, or listens for radio signals from the smart card 110. On establishing a secure communication channel between the contactless device 120 and the smart card 110, the contactless device 120 may request a list of applications 115 available from the smart card 110. A directory is first displayed, after which, based on the set priority or the type of smart card 110, an application 115 and 122 are chosen and initiated for the transaction.

An exemplary smart card 110 can refer to a smart device that can communicate via an electronic, magnetic or radio frequency field between the card 110 and another device, such as a contactless device 120 or a card reader 150. In an exemplary embodiment, the smart card 110 has processing capabilities, such as storage capacity/memory 113 and one or more applications 115 that can perform a particular function. In an exemplary embodiment, the smart card also has an NFC enabled chip (not illustrated) implemented, either independently or on existing components, within the smart card 110. Exemplary smart cards 110 may include MIFARE cards, stored value memory cards, and other types of memory cards.

In an exemplary embodiment, the memory 113 and application 115 may be implemented in a secure element, as described previously, on the smart card 110. The smart card 110 also may contain one or more access keys 119 that control access to the information contained in the memory 113. For example, security measures can include password keys and logic that are hard-coded into the smart card 110 by the manufacturer. In an exemplary embodiment, the access keys 119 contained on the smart card 110 are also used for mutual authentication between the smart card 110 and the contactless device 120. For example, a smart card which does not contain a correct access key 119 will not be authenticated by the contactless device 120. As a result, the transaction will be rejected. In an exemplary embodiment, the smart card 110 contains one or more of a cashier key, a teller key, and a mint key. As described above, a cashier access key is used to change the value of the smart card 110 by withdrawing funds and a teller access key is used to put value onto the smart card 110 by depositing funds. An exemplary mint key is used to change any of the existing keys resident on the smart card 110. In an exemplary embodiment, the mint key is used to setup the keys, reset the card data and reset the counters. In an exemplary embodiment, the teller and cashier keys may be rotated. For example, the keys may be rotated based on a defined time period, data capacity, or other defined basis for rotation. The mint key may define the basis for rotating the access keys 119. In an exemplary embodiment, the access keys 119 will define levels of access/permission to read and write data to the smart card 110.

In an alternative exemplary embodiment, a symmetric key may be utilized to encrypt the data on the smart card 110, so that an NFC-enabled device without such a key cannot comprehend the data on the smart card 110. The key is shared with the remote system 160, the contactless device 120, and the card reader 150.

In an exemplary embodiment, a monotonic counter 117 may also be implemented in a secure element on the smart card 110. Counters may store the number of times a particular event or process has occurred. An exemplary counter is monotonic and thus, only allows for the values to be increased or incremented, not decreased. This preventative measure prevents users from saving the current state of a smart card 110, using the card and then rolling the card back to the previously saved state, thereby receiving a free transaction. An exemplary embodiment, a sum of deposits and a sum of withdrawals are stored in the monotonic counter 117. The sum of deposits and sum of withdrawals can be compared to the saved transaction history on the smart card 110 when a transaction is requested. Because the sum of deposit and/or sum of withdrawals are store in the monotonic counter (which can only be incremented, not decreased), a smart card 110 that has been rolled back to a previous state can be detected and inactivated. The method of determining the sum of withdrawals and sum of deposits is described in more detail hereinafter with reference to the methods described in FIGS. 2-10.

In an alternative exemplary embodiment, a monotonic counter 117 is increased during each withdrawal transaction and the total number of withdrawal transactions saved in the transaction history is compared to the number designated by the monotonic counter 117. Likewise, a monotonic counter 117 may be increased during each deposit transaction and the total number of deposit transactions saved in the transaction history is compared to the number designated by the monotonic counter 117.

As depicted in FIG. 1, the card reader 150 may be a component of the contactless device 120. For example, in an exemplary embodiment, the card reader 150 is a contactless device application 122, wherein information exchanged with the smart card 110 via the secure communication channel 130 and antenna 128 is processed via the application 122.

In an alternative exemplary embodiment, the card reader 150 may be a separate standalone device that communicates with the smart card 110 via one or more secure communication channels 130 and with the contactless device 120. As a standalone device, the card reader 150 can refer to a device that can communicate via an electronic, magnetic, or radio frequency field between the card reader 150 and another device, such as the smart card 110 and/or the contactless device 120. In this embodiment, the card reader 150 passes information between the smart card 110 and the contactless device 120. Additionally, when implementing this embodiment, the contactless device 120 may be a computer that does not have contactless NFC functionality, such as a desktop computer, server computer, laptop computer, mobile computing device (such as a mobile telephone, tablet computer, or smart phone), or other non-NFC enabled device.

In an exemplary embodiment, the card reader 150 has processing capabilities, such as storage capacity/memory and one or more applications 155 that can perform a particular function. In an exemplary embodiment, the card reader 150 contains an operating system (not illustrated) and user interface (not illustrated).

The card reader 150 is communicatively coupled to the contactless device 120 via a direct connection, via one or more secure communication channels 130, or via a network 140 (connection not illustrated). An exemplary card reader 150 may contain an access key, as described above.

As further depicted in FIG. 1, the contactless device 120 may be communicatively coupled to the remote system 160 via a network 140. In an alternative exemplary embodiment, the card reader 150 is also communicatively coupled to the remote system 160 via a network 140. The network 140 comprises a telecommunication means by which network devices (including devices 120, 150, and 160) can exchange data. For example, the network 140 can be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, Bluetooth, NFC or any other appropriate architecture or system that facilitates the communication of signals, data and/or messages (generally referred to as data).

According to an exemplary embodiment, the contactless device 120 may connect to network 140 via a wired connection. For example, the connection may be a wired universal serial bus (USB) or Ethernet connection. In an alternative exemplary embodiment, the contactless device 120 may connect to the network via a wireless connection. For example, the connection may be a Wi-Fi or Bluetooth connection to a hotspot that has a wired/wireless Internet connection (for example, MiFi), or any other wired or wireless connection suitable for communicating signals with network 140. In an alternative exemplary embodiment, the connection may be a cellular network connection.

The exemplary remote system 160 enables storage of smart card 110 account information. In an exemplary embodiment, the user (not illustrated) creates a user account with the remote system 160 and registers a smart card 110. The remote system stores the smart card 110 data, including a history of all the card transactions, for example, each deposit of funds and each withdrawal of funds, for each account in the data storage unit 161. In an exemplary embodiment, the remote system 160 analyzes the transaction history to identify missing data or possible errors.

In an exemplary embodiment, one or more signing keys 167 are utilized to authenticate and certify data by the remote system 160. For example, the signing keys 167 may be symmetric or asymmetric keys. In an exemplary embodiment, the signing keys 167 exist only on the remote system 160 and are not readable or otherwise accessible by the contactless device 120, smart card 110 or card reader 150. An exemplary signing key 167 is designated as a teller signing key or a cashier signing key. An exemplary teller signing key is used to authenticate and certify a depositing funds onto a smart card 110. An exemplary cashier signing key is used to authenticate and certify a withdrawal of funds from a smart card 110. In an exemplary embodiment, each deposit and each withdrawal transaction is certified by a signing key 167 resident on the remote system 160. Whenever a merchant reads a smart card 110, it may verify that the transaction records stored on the card are certified by a valid signing key 167. In an exemplary embodiment, the signing keys 167 authorize and certify the transaction records with a digital signature signed by an asymmetric key. In an alternative exemplary embodiment, the signing keys 167 authorize and certify the transaction records with a message authorization code (MAC) signed by a symmetric key. The methods of certifying a transaction are described in more detail hereinafter with reference to the methods described in FIG. 2-10.

Throughout this specification, it should be understood that the terms "data" and "information" are used interchangeably herein to refer to text, images, audio, video, or any other form of information that can exist in a computer-based environment.

The components illustrated in FIG. 1 will be described in further detail hereinafter with reference to the methods depicted in FIGS. 2-7.

System Process

Figure 2:
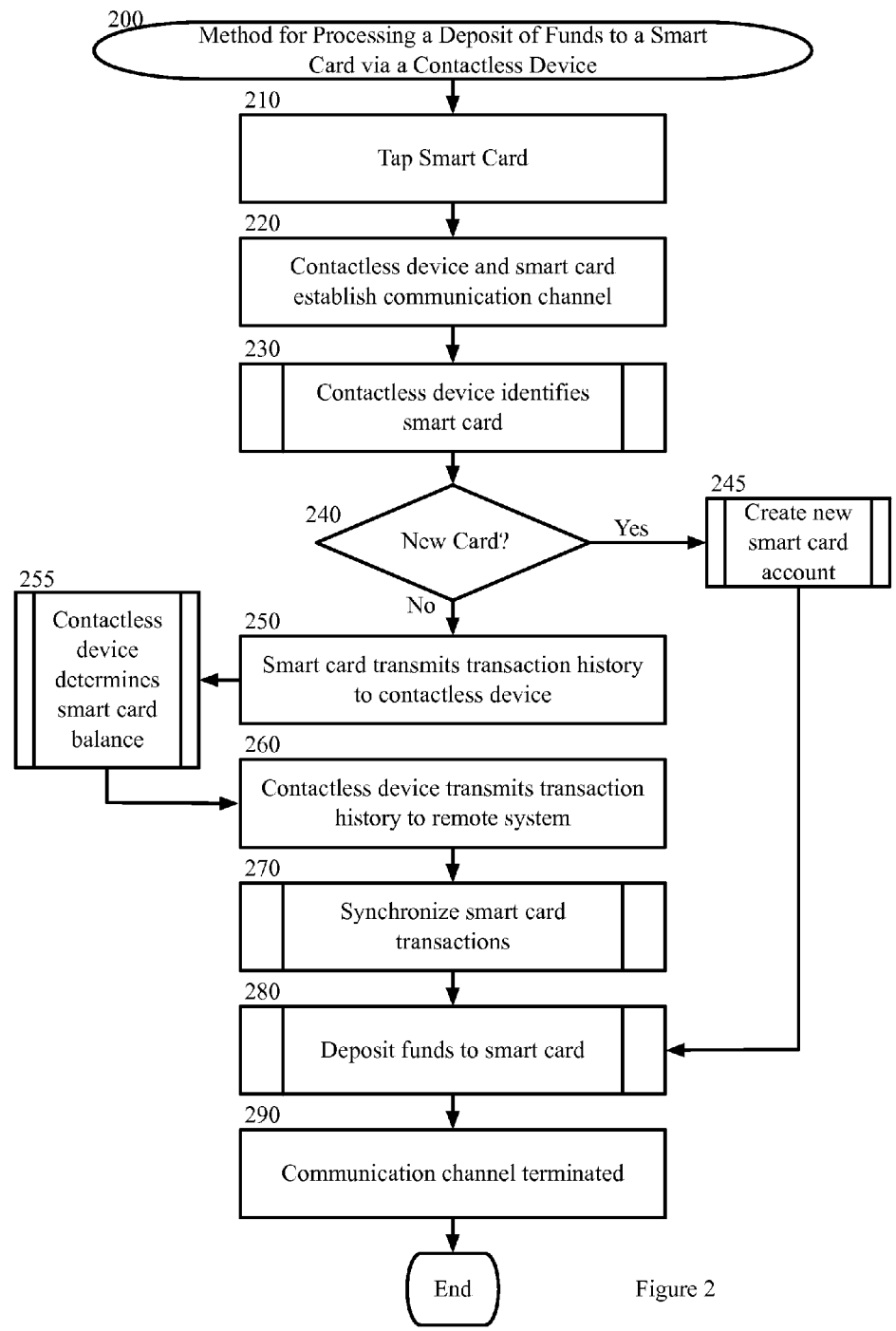
FIG. 2 is a block flow diagram depicting a method for processing a deposit of funds to a smart card via a contactless device according to an exemplary embodiment.

FIG. 2 is a block flow diagram depicting a method for processing a deposit of funds to a smart card 110 via a contactless device 120 according to an exemplary embodiment. The method 200 is described with reference to the components illustrated in FIG. 1.

In an exemplary embodiment, a deposit transaction must be authorized by the remote system 160 and certified by the cashier signing key 167. The contactless device 120 has network 140 access, to provide for such authorization and certification.

In block 210, the user "taps" the smart card 110 in the proximity of the contactless device 120. In an exemplary embodiment, the contactless device 120 generates a radio frequency (RF) or other field polling for the presence of a smart card 110, and the user "taps" the smart card 110 by placing the card 110 within the field of the contactless device 120. In an alternative exemplary embodiment, the merchant activates the RF field or other field to poll for the presence of a smart card 110 using an application 122 on the contactless device 120. In certain exemplary embodiments, the systems and methods described in FIGS. 2-3 herein are performed while the smart card 110 is tapped.

The contactless device 120 detects the smart card 110 and establishes a secure communication channel 130 in block 220. In an exemplary embodiment, the secure communication channel 130 is an NFC communication channel.

In block 230, the contactless device 120 identifies the smart card 110. The method of identifying the smart card 110 is described in more detail hereinafter with reference to the methods described in FIG. 8.

Figure 5:
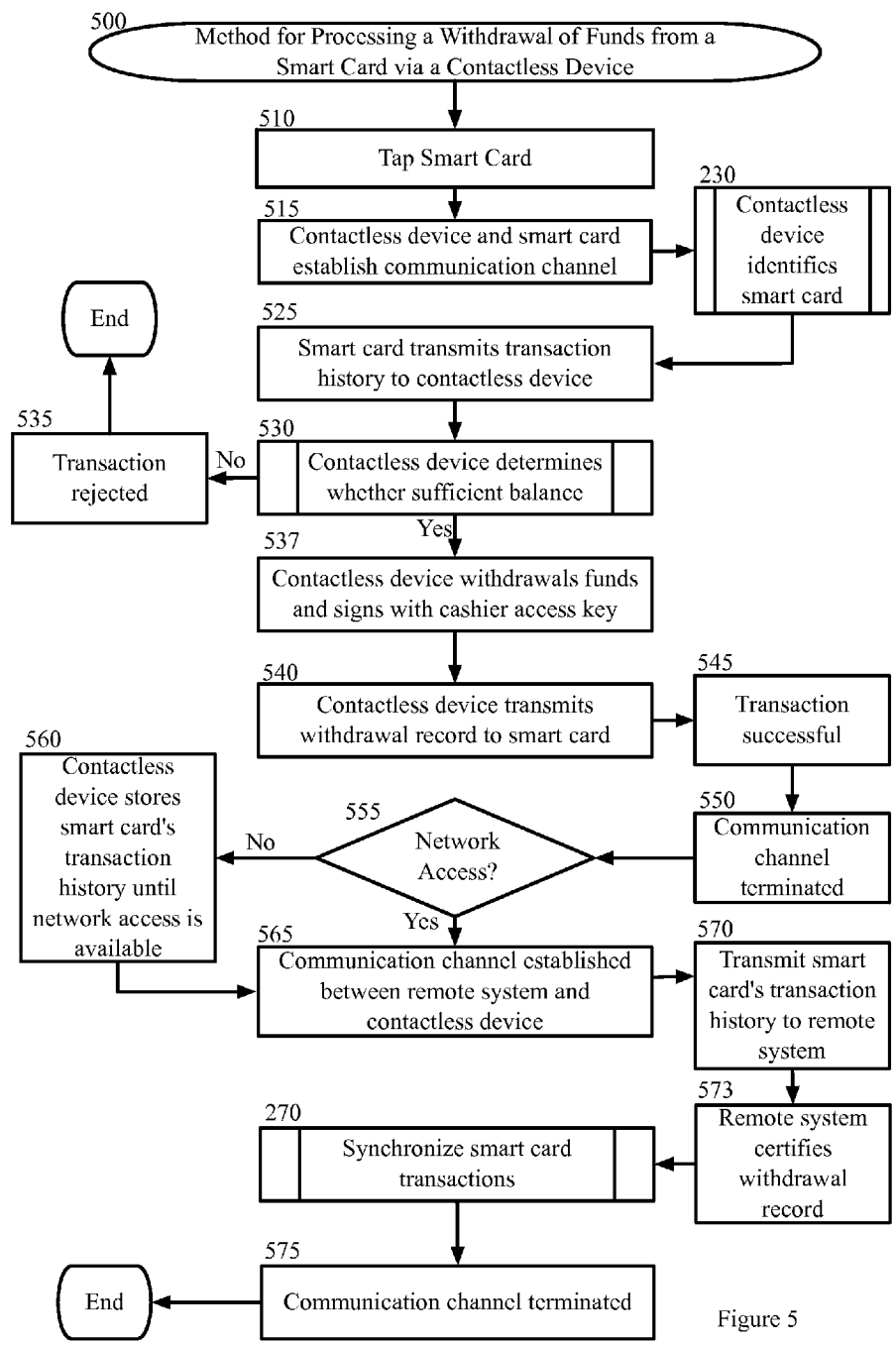
FIG. 5 is a block flow diagram depicting a method for processing a withdrawal of funds from a smart card via a contactless device according to an exemplary embodiment.
Figure 8:
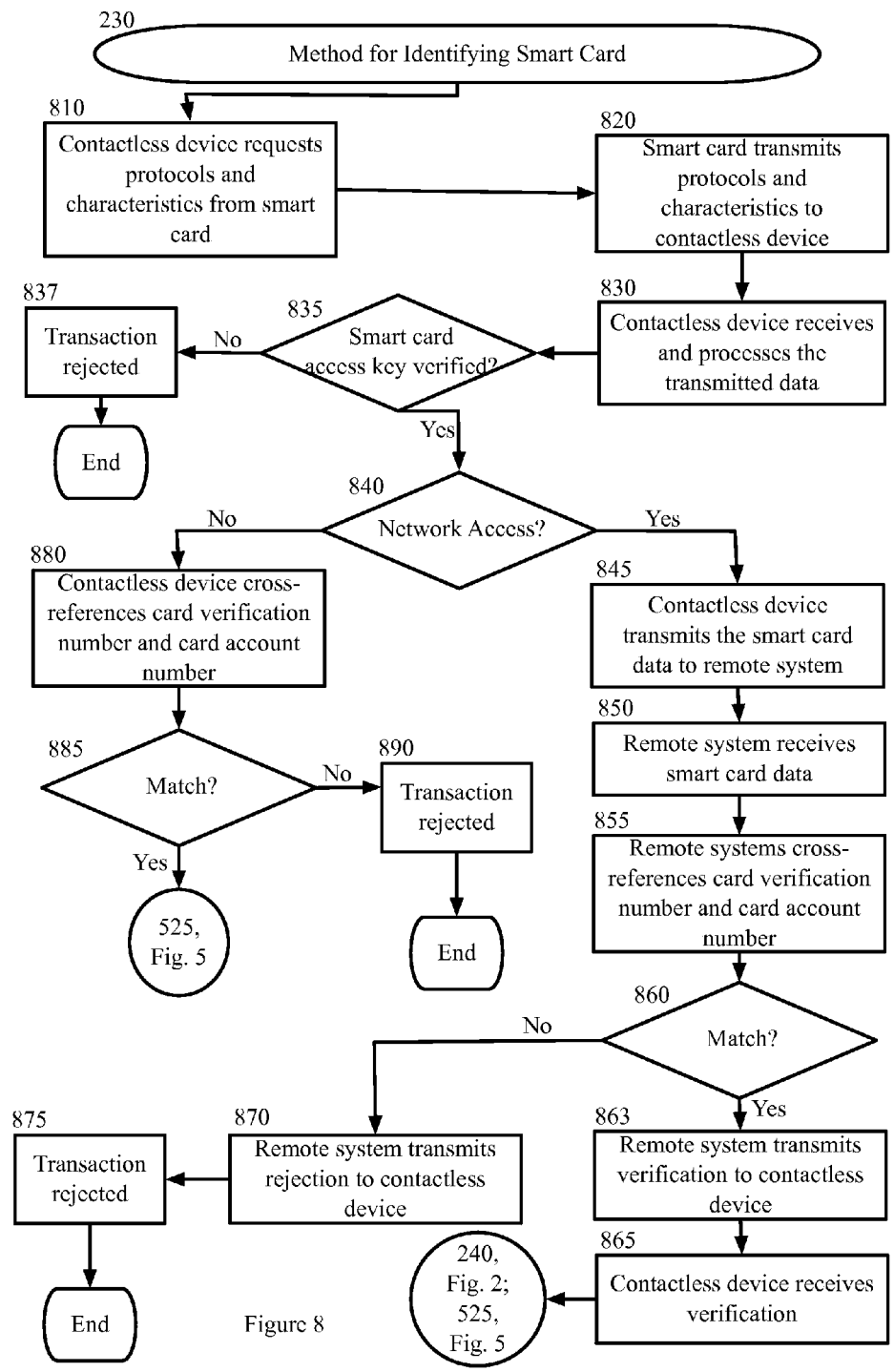
FIG. 8 is a block flow diagram depicting a method for identifying a smart card according to an exemplary embodiment.

FIG. 8 is a block flow diagram depicting a method for identifying the smart card 110 according to an exemplary embodiment, as referenced in block 230 of FIGS. 2 and 5. The method 230 is described with reference to the components illustrated in FIG. 1.

In block 810, the contactless device 120 requests protocols and characteristics from the smart card 110. For example, the contactless device 120 may request the identification of communication protocols (for instance ISO/IEC 14443, MIFARE, and/or ISO/IEC 18092), a list of applications 115 available, card identification information (for instance a card number), and security protocols from the smart card 110. In an exemplary embodiment, the contactless device 120 also requests the card verification number. In an exemplary embodiment, the contactless device 120 may request verification of the access keys 119 contained on the smart card 110 for mutual authentication between the smart card 110 and the contactless device 120.

In block 820, the smart card 110 transmits the requested protocols and characteristics to the contactless device 120. In an exemplary embodiment, the card verification number is encoded and stored in the memory 113 of the smart card 110 and not visible or otherwise written on the physical card. The requested information is extracted and transmitted to the contactless device 120 via the secure communication channel 130. In an alternative exemplary embodiment, the smart card 110 is swiped in block 220. In this embodiment, the card account number and the card verification are encoded in the data stored in the magnetic stripe of the card and read by the contactless device 120.

In an exemplary embodiment, the data may include the sum of deposits and/or the sum of withdrawal information. In an exemplary embodiment, the contactless device 120 is capable of reading the data contained in the monotonic counters 117. In an exemplary embodiment, the contactless device 120 uses this data to determine the smart card 110 balance. The method of determining the smart card 110 balance is described in more detail hereinafter with reference to the methods described in FIG. 10.

In block 830, the contactless device 120 receives and processes the protocols and characteristics transmitted by the smart card 110. In an exemplary embodiment, the data encoding the card verification number may be decoded by the remote system 160. In this exemplary embodiment, the contactless device 120 receives the data encoding the card verification number, without reading or decoding the data, and communicates it to the remote system 160 for verification. In an alternative exemplary embodiment, the contactless device 120 may also be capable of decoding the card verification number and confirm the identity of the smart card 110.

In an alternative exemplary embodiment, the contactless device 120 reads the information (including the protocols, characteristics and data encoding the card verification number) directly from the smart card 110.

In block 835, the contactless device 120 verifies the smart card 110 access key 119 and the smart card 110 verifies the contactless device 120 access key 129. In an exemplary embodiment, the contactless device 120 verifies the smart card 110 access key 119 with the session access key 129 resident on the contactless device 120. The smart card 110 generates a number and transmits the number to the contactless device 120. The contactless device 120 decrypts the number using the session access key 129 and transmits the decrypted number back to the smart card 110. In an exemplary embodiment, the smart card 110 verifies the contactless device 120 session access key 129 with the access key 119 resident on the smart card 110. The contactless device 120 generates a number and transmits the number to the smart card 110. The smart card 110 decrypts the number using the access key 119 and transmits the decrypted number back to the smart card 110. If the number decrypted by the smart card 110 and the number decrypted by the contactless device 120 match, the smart card and contactless devices are verified. In an exemplary embodiment, this verification indicates that the smart card 110 and contactless device 120 have the correct permissions.

If the access keys 119 and 129 are not verified, the transaction is rejected, in block 837 and the method ends.

If the access keys 119 and 129 are verified, the method 230 continues to block 840.

In block 840, the contactless device 120 determines whether it has network 140 access. For example, if the contactless device 120 has network 140 access, the method 230 may occur while the contactless device 120 is connected to the remote system 160 and the smart card 110 data may be transmitted to the remote system 160. However, if the contactless device 120 does not have network 140 access and the transaction is occurring offline, the contactless device 120 may proceed with the transaction without transmitting the smart card 110 data to the remote system 160.

If the contactless device 120 has network 140 access, the contactless device 120 transmits the smart card 110 data to the remote system 160, in block 845. In an exemplary embodiment, the contactless device 120 will have network 140 access for every deposit transaction. In an exemplary embodiment, the contactless device 120 has network access and the smart card data is automatically transmitted to the remote system 160 upon receipt by the contactless device 120. In an alternative exemplary embodiment, the operator of the contactless device 120 initiates the transmission of the smart card data to the remote system 160. In an exemplary embodiment, the smart card data comprises the card account number and the card verification number.

In block 850, the remote system 160 receives the smart card data from the contactless device. In an exemplary embodiment, the remote system 160 maintains a database of all smart cards and an account for each smart card 110. Each account for a particular smart card 110 can comprise one or more of information maintained on the smart card 110, user registration information, transaction history, and other information for maintaining the smart card 110. The remote system 160 can store each account record in the database 161. The card account information and the card verification number are among the data communicated from the contactless device 120 to the remote system 160 and stored in the account.

In block 855, the remote system 160 cross-references the card verification number and the card account number. In an exemplary embodiment, the remote system 160 accesses the database of all smart cards and cross-references the numbers. In an alternative exemplary embodiment, the remote system 160 accesses the smart card 110 account using the card account number and looks up the card verification number. In an exemplary embodiment, the remote system 160 is capable of confirming the identity of the smart card from the data transmitted. The remote system 160 cross-references the card account number and the card verification number. In an exemplary embodiment, the card verification number is a 32-bit number specific to the card account number. The card verification number may be a randomly generated number written into the card data when the smart card 110 was created. The card verification number may or may not be a number unique to a single card. For example, more than one smart card may have same card verification number. However, each smart card 110 has only one card verification number and the correct card verification number must be submitted with the matching card account number to confirm a valid transaction.

In an exemplary embodiment, a new or inactivated smart card 110 may not contain a card verification number. The lack of a verification number may indicate to the remote system 160 that the smart card needs to be activated and the remote system 160 may transmit a message to the contactless device 120.

In block 860, the remote system 160 determines if the card verification number and card account number belong to the same card, thus confirming the identity of the smart card 110.

If the numbers are a match, the remote system 160 transmits verification of the identity of the smart card 110 to the contactless device, in block 863.

In block 865, the contactless device 120 receives the verification from the remote system 160.

From block 865, the method 230 proceeds to block 240 (FIG. 2), block 525 (FIG. 5) or as appropriate.

Returning to block 860 (FIG. 8), if the card verification number and card account number do not belong to the same smart card 110, the identity of the smart card 110 is not verified and the method 230 proceeds to block 870.

In block 870, the remote system 160 transmits a rejection message to the contactless device 120 indicating that the identity of the smart card 110 could not be verified.

In block 875, the contactless device 120 receives the message from the remote system 160. The contactless device 120 rejects the smart card 110 transaction and the secure communication channel 130 is terminated.

Returning to block 840 (FIG. 8), if the contactless device 120 does not have network 140 access, contactless device 120 may read the card identification information, including the card account number and card verification number, in block 880. The contactless device 120 may perform the smart card 110 verification without transmitting the data to the remote system 160 in block 845. In an exemplary embodiment, the remote system 160 periodically communicates current smart card 110 information to the contactless device 120. Exemplary smart card 110 information comprises smart card account numbers and corresponding card verification numbers. In an exemplary embodiment, the smart card 110 information is stored by the contactless device 120. In an alternative exemplary embodiment, the smart card 110 information is transmitted in the session access key 129 transmitted by the remote system 160 to the contactless device 120 at the beginning of each new session. In an exemplary embodiment, during an offline transaction, the contactless device 120 can cross-reference the smart card 110 account number and verification number from the information transmitted by the remote system 160 without network 140 access to the remote system 140.

In block 885, the contactless device 120 determines if the card verification number and the card account number are a valid match. In an exemplary embodiment, when a withdrawal transaction is performed without network 140 access, the contactless device 120 may confirm the identity of the smart card 110 during the transaction process, as described in FIG. 5. In an exemplary embodiment, the contactless device 120 will confirm that a valid card verification number is encoded by the smart card 110 without accessing the remote system 160 database. A valid card verification number may comprise any number that fulfills the perimeters designated by the remote system 160. For example, the card verification number may be any 32-bit number that is encoded by the smart card 110 as the verification number.

If the identity of the smart card 110 is not verified, the transaction is rejected in block 890 and the secure communication channel 130 is terminated.

If the identity of the smart card 110 is verified, the method 230 proceeds to block 525 (FIG. 5) or as appropriate.

Returning to FIG. 2, in block 240, the contactless device 120 determines whether the smart card 110 is a new or existing card. In an exemplary embodiment, the contactless device 120 is capable of determining whether the smart card 110 is a new or existing card from the smart card data transmitted in block 230. For example, the smart card data may indicate that the smart card 110 has not yet been activated or that a card verification number has not yet been assigned. In an alternative exemplary embodiment, the remote system 160 may respond with information regarding the smart card 110, such as whether the smart card 110 is an existing card registered with the remote system 160 or the smart card 110 is a new card that has not been registered to a user. In another alternative exemplary embodiment, the contactless device 120 may determine that the smart card has not yet been activated by the absence of an access key 119.

If the smart card 110 is not new but is already registered with the remote system 160, the smart card 110 transmits the entire saved transaction history from its memory 113 to the contactless device 120, in block 250. In an exemplary embodiment, the smart card 110 transmits all deposit and withdrawal transactions to the contactless device 120. If the amount of the transactions exceeds the storage/memory 113 capabilities of the smart card 110, the oldest transactions are dropped from the smart card memory 113. In an exemplary embodiment, the smart card 110 alternatively or additionally transmits the sum of deposits and the sum of withdrawals for all previous transactions to the contactless device 120.

In an exemplary embodiment, the smart card 110 also transmits the data stored in the monotonic counters 117. The data may include the sum of deposits and/or the sum of withdrawal information. In an exemplary embodiment, the contactless device 120 is capable of reading the data contained in the monotonic counters 117, but is incapable or writing or otherwise changing this data. In an exemplary embodiment, the contactless device 120 uses this data to determine the smart card 110 balance. The method of determining the smart card 110 balance is described in more detail hereinafter with reference to the methods described in FIG. 10.

Figure 10:
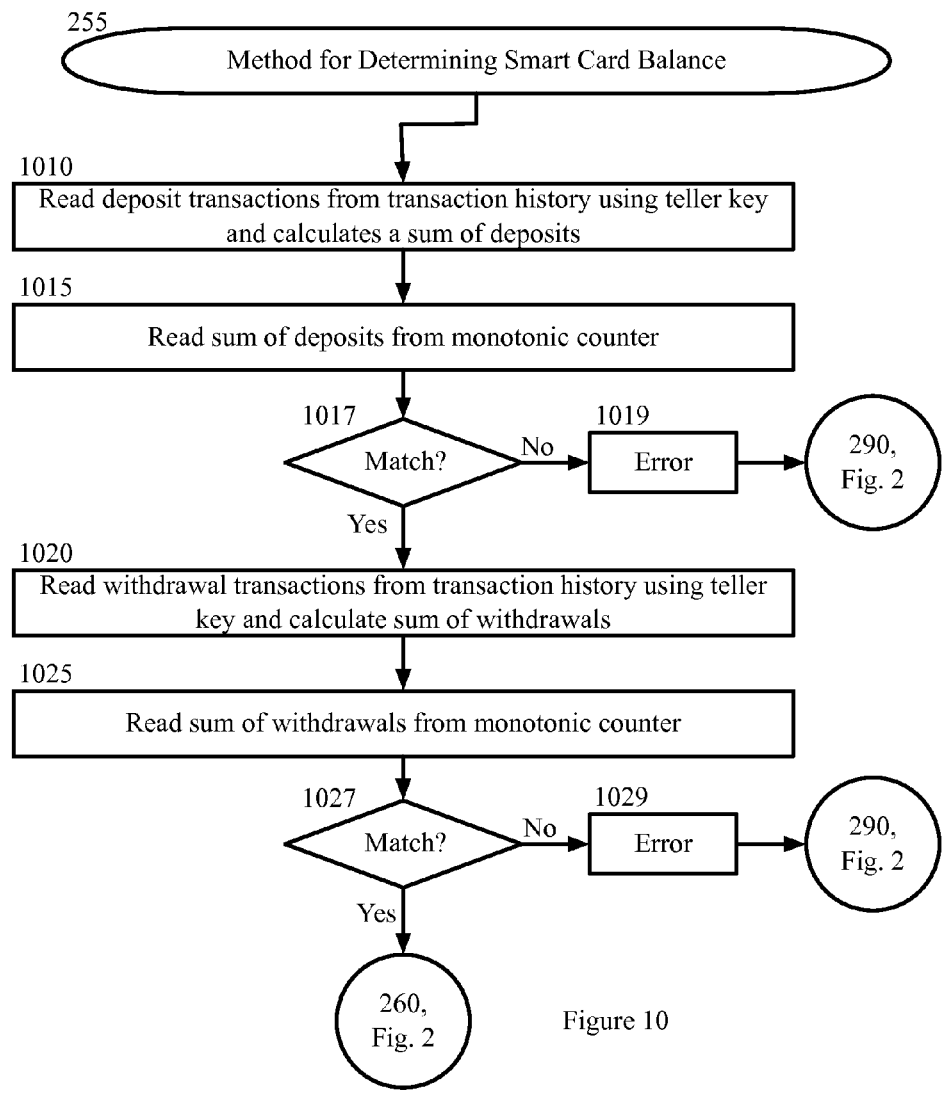
FIG. 10 is a block flow diagram depicting a method for determining the balance on a smart card according to an exemplary embodiment.

FIG. 10 is a block flow diagram depicting a method for determining the smart card 110 balance according to an exemplary embodiment, as referenced in block 255 of FIG. 2. The method 255 is described with reference to the components illustrated in FIG. 1.

In block 1010, the contactless device 120 reads the deposit transactions written in the transaction history on the smart card 110. In an exemplary embodiment, the contactless device 120 uses the teller access key 129 to read the current deposit transactions. The contactless device 120 then calculates the sum of deposits.

In an exemplary embodiment, a deposit transaction is recorded as:
D1: sum of deposits before this transaction
D2: sum of deposits after this transaction
Notation: +,D1→D2

In block 1015, the contactless device 120 reads the sum of deposits from the monotonic counter 117.

In block 1017, the contactless device 120 compares the sum of deposits calculated in block 1010 to the sum of deposits read from the monotonic counter 117 in block 1015.

If these numbers do not match, a smart card 110 error is indicated in block 1019 and the method 255 proceeds to block 290 in FIG. 2.

If these numbers match, the method 255 proceeds to block 1020 in FIG. 10.

In block 1020, the contactless device 120 reads the withdrawal transactions written in the transaction history on the smart card 110. In an exemplary embodiment, the contactless device 120 uses the teller key 129 to read the current withdrawal transactions. The contactless device 120 then calculates the sum of withdrawals.

In an exemplary embodiment, a withdrawal transaction is recorded as:
W1: sum of withdrawals before this transaction
W2: sum of withdrawals after this transaction
Notation: −,W1→W2

In block 1025, the contactless device 120 reads the sum of withdrawals from the monotonic counter 117.

In block 1027, the contactless device 120 compares the sum of withdrawals calculated in block 1020 to the sum of withdrawals read from the monotonic counter 117 in block 1025.

If these numbers do not match, a smart card 110 error is indicated in block 1029 and the method 255 proceeds to block 290 in FIG. 2.

If these numbers match, the method 255 proceeds to block 260 in FIG. 2.

Returning to FIG. 2, in block 260, the contactless device 120 transmits the smart card 110 transaction history to the remote system 160. In an exemplary embodiment, the deposit transaction occurs when the contactless device 120 has network 140 access, allowing for simultaneous transmission of the smart card 110 transaction history to the remote system 160. In an alternative embodiment, the smart card 110 transaction history is stored on the contactless device 120 and transmitted to the remote system 160 at a later time after the completion of the deposit of funds via a wireless or wired network connection 140.

In an exemplary embodiment, the card identification information is transmitted to the remote system 160 with the transaction history. The card identification information comprises the card account number and the card verification number. The transmission of the card identification information enables the remote system 160 to associate the transaction history with the correct smart card 110 account and to confirm the identity of the smart card 110. The methods for confirming the identity of the smart card 110 are described above with reference to method 230 (FIG. 8).

After the smart card 110 transactions are transmitted to the remote system 160, the remote system 160 analyzes and synchronizes the transactions, in block 270. In an exemplary embodiment, block 270 occurs immediately after the transmission of the transactions to the remote system 160. In an alternative exemplary embodiment, block 270 occurs at a later time or at a set durational time period (for example, every 24 hours). The method 270 of synchronizing smart card 110 transactions on the remote system 160 is described in more detail hereinafter with reference to the methods described in FIG. 7.

The method 200 then proceeds to block 280 in FIG. 2.

Returning to block 240, if the smart card 110 is new, the new card is activated and/or a new account is created at block 245. The method for creating a new smart card account is described in more detail hereinafter with reference to the methods described in FIGS. 4a and 4b.

If the smart card 110 is new, a new account is created at block 245. In an exemplary embodiment, the user creates a new user account or logs into an existing account via the remote system 160, with which the smart card 110 will be associated. The method 245a depicted in FIG. 4a describes associating a new smart card with a new or existing user account at the remote system 160.

In an alternative exemplary embodiment, the user activates a new smart card 110 without creating or logging into a remote system 160 account. In this case, only a smart card account is created at the remote system 160. The method for activating a new smart card 110 without a user account is described in more detail hereinafter with reference to the methods described in FIG. 4b.

Figure 4A:
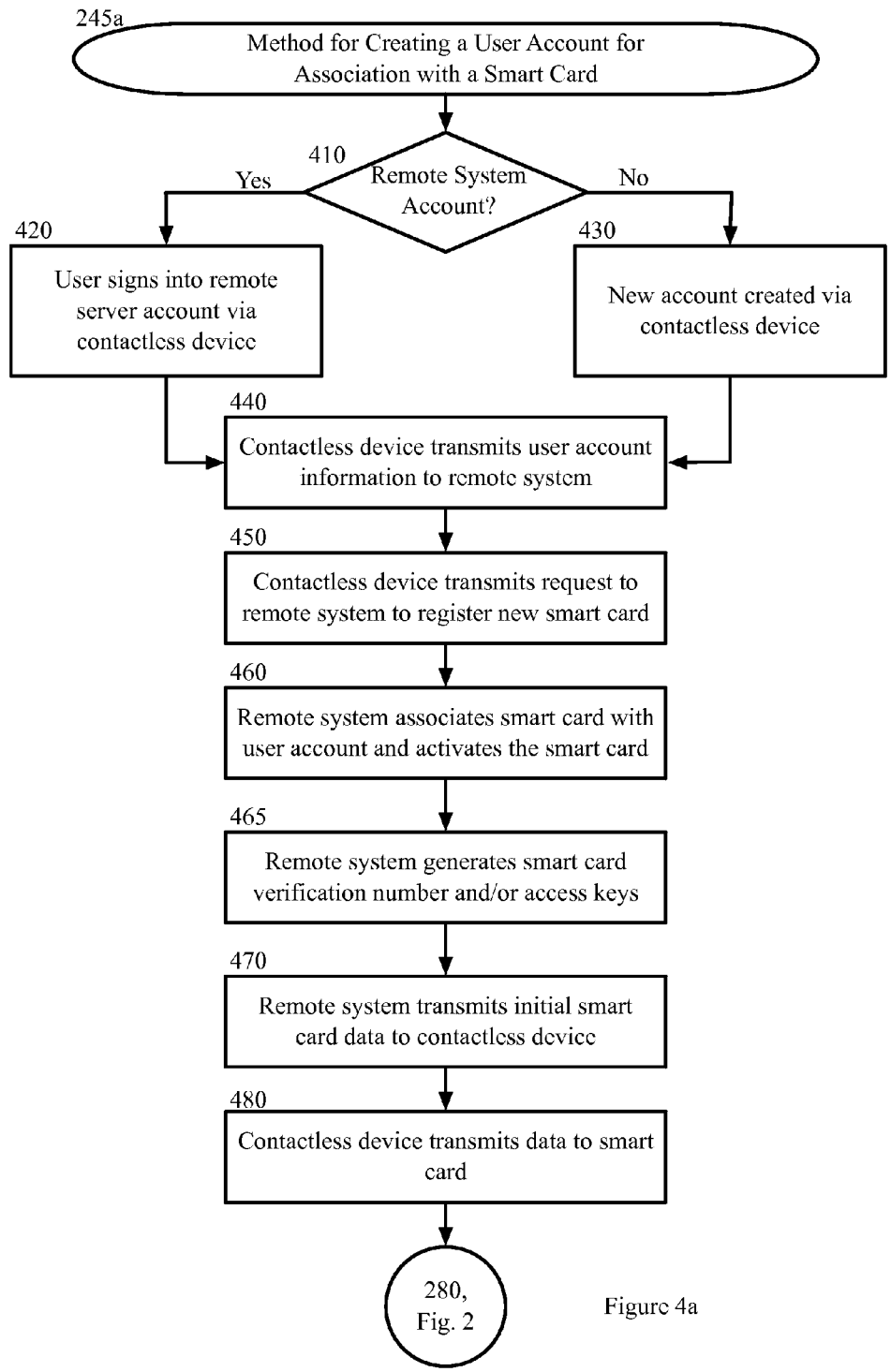
FIG. 4a is a block flow diagram depicting a method for creating a remote system user account for association with a smart card account according to an exemplary embodiment.

FIG. 4a is a block flow diagram depicting a method 245a for creating a remote system 160 user account for association with a smart card 110 according to an exemplary embodiment, as referenced in block 245 of FIG. 2. The method 245a is described with reference to the components illustrated in FIG. 1.

Referring to FIG. 4a, in block 410, the contactless device 120 determines whether the user has a remote system 160 account.

If the user has a remote system 160 account, the user signs into the account via the contactless device 120, in block 420. In an exemplary embodiment, the user utilizes the user interface 121 of the contactless device 120 to communicate with the remote system 160 to access the user's account. For example, the user may input a personal identification number or other identifying and/or authentication information to identify and access the user's account at the remote system 160.

If the user does not have a remote system 160 account, the user may create a new account via the contactless device 120, in block 430. In an exemplary embodiment, the user utilizes the user interface 121 of the contactless device 120 to communicate with the remote system 160 to create an account. The user may be prompted to enter identifying information, for example, user name, phone number, e-mail address, personal identification number or other password, or other suitable information to create the user account.

In block 440, the contactless device 120 transmits the user account information to the remote system 160. Portions or all of block 440 may occur simultaneously with performance of blocks 420 or 430. In an exemplary embodiment, the contactless device 120 has network 140 access and transmits the user account information using a wireless connection. In an alternative exemplary embodiment, the contactless device 120 is connectively coupled via a wired connection to a computer that accesses the remote system 160.

In block 450, the contactless device 120 transmits a request to the remote system 160 to register a new smart card 110 with the user's account. In an exemplary embodiment, the request includes information to identify the card, such as a card number or other identifying information stored on the smart card 110. The request also may include the date the card was registered (for example, a time stamp), where the card was registered (for example, information identifying the merchant that registered the card), user information, or other suitable information.

The remote system 160 associates the smart card 110 with the user's account and activates the smart card 110, in block 460. In an exemplary embodiment, the remote system 160 notes the information included in the request in the user account to allow the user to view the smart card 110 transaction history, sum of withdrawals, and sum of deposits by logging onto the user's remote system 160 account.

In block 465, the remote system 160 generates a card verification number and assigns this number to the smart card 110. The card verification number is a number specific to the smart card account number. In an exemplary embodiment, the card verification number is a 32-bit number randomly generated by the remote system 160. The card verification number is encoded in data that will be written on the smart card 110 and used to identify the smart card 110 to the remote system 160. In an exemplary embodiment, the remote system 160 also generates one or more access keys 119 for the smart card 110.

In block 470, the remote system 160 transmits the initial smart card 110 data to the contactless device 120. In an exemplary embodiment, the initial data comprises activation data for the smart card 110, which allows the smart card 110 to be used for purchase and/or deposit transactions. In an exemplary embodiment, the activation data also comprises the card verification number. In an exemplary embodiment, the activation data includes one or more access keys 119.

In block 480, the contactless device 120 transmits the activation data to the smart card 110 and the activation data is stored in the memory 113 of the smart card 110. In an exemplary embodiment, the activation data is not stored in the contactless device. The smart card data, including the activation data is wiped from the contactless device 120 when the secure communication channel 130 is terminated.

From block 480, the method 245a proceeds to block 280 (FIG. 2) and funds are deposited onto the smart card 110.

Figure 4B:
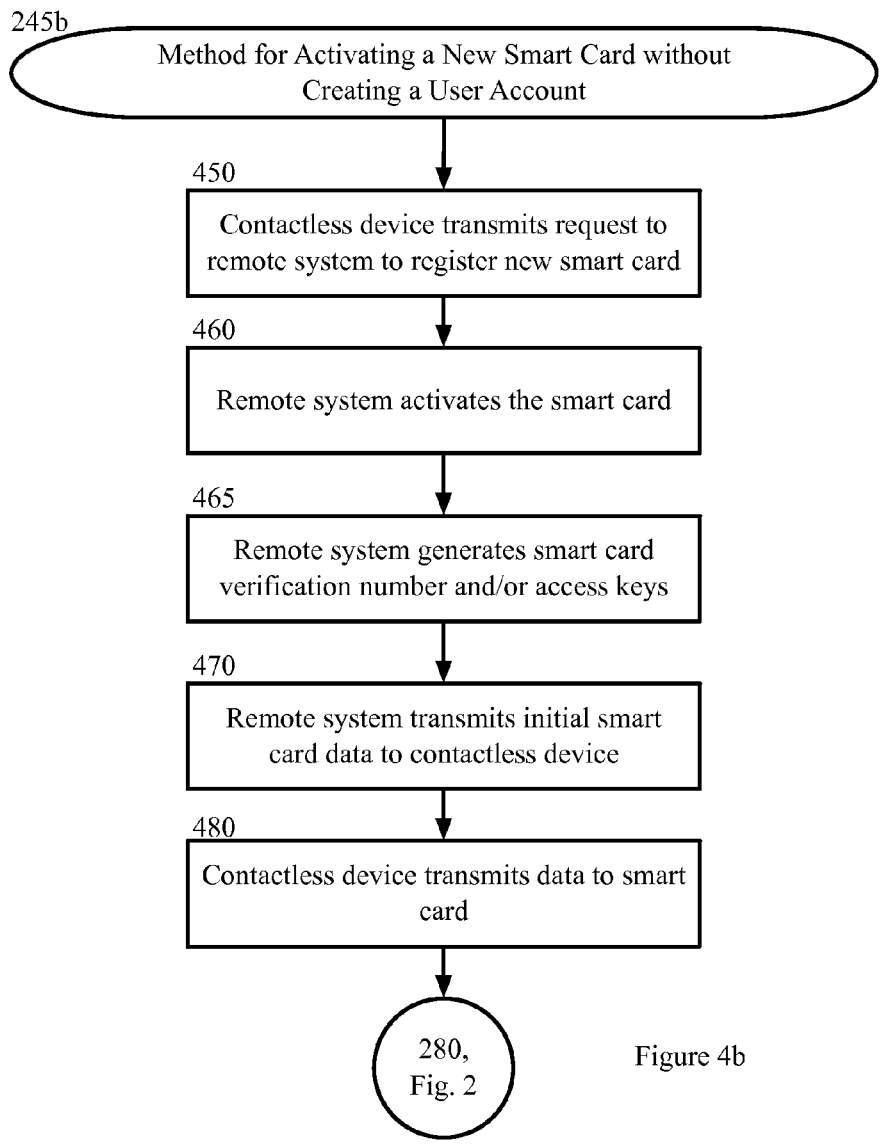
FIG. 4b is a block flow diagram depicting a method for activating a new smart card without associating the smart card with a remote system user account according to an exemplary embodiment.

FIG. 4b is a block flow diagram depicting a method 245b for activating a new smart card 110 without associating the smart card 110 with a remote system 160 user account according to an exemplary embodiment, as referenced in block 245 of FIG. 2. The method 245b is described with reference to the components illustrated in FIG. 1.

Blocks 450, 465, 470, and 480 depicted in FIG. 4b are similar to blocks 450, 465, 470, and 480 depicted in FIG. 4a.

Referring back to FIG. 2, the contactless device 120 detects the smart card 110 and establishes a secure communication channel 130 in block 220, and the contactless device 120 identifies the smart card 110, in block 230. The contactless device 120 then determines whether the smart card 110 is a new or existing card, in block 240. In an exemplary embodiment, the user activates a new smart card 110 without creating or logging into a remote system 160 account.

In block 450, the contactless device 120 transmits a request to the remote system 160 to register a new smart card 110.

The remote system 160 activates the smart card 110, in block 460. In an exemplary embodiment, the remote system 160 logs the smart card activation information in a database. The smart card activation information may comprise one or more of the following: card account number, date of activation, location of activation and merchant identification. In an alternative exemplary embodiment, the remote system 160 assigns a personal identification number (PIN) or other authentication code to the smart card 110.

In block 465, the remote system 160 generates a card verification number and assigns this number to the smart card 110. The card verification number is a number specific to the smart card account number. In an exemplary embodiment, the card verification number is a 32-bit number randomly generated by the remote system 160. The card verification number is encoded in data that will be written on the smart card 110 and used to identify the smart card 110 to the remote system 160. In an exemplary embodiment, the remote system 160 also generates one or more access keys 119 for the smart card 110.

In block 470, the remote system 160 transmits the initial smart card 110 data to the contactless device 120. In an exemplary embodiment, the initial data includes the activation data for the smart card 110 and may include the assigned PIN.

The contactless device 120 transmits the activation data to the smart card, in block 480, which stores the activation data in the memory 113.

From block 480, the method 245b proceeds to block 280 (FIG. 2) and funds are deposited onto the smart card 110.

Returning to FIG. 2, in block 280, the contactless device 120 deposits funds onto the smart card 110. The method of depositing funds is described in more detail hereinafter with reference to the methods described in FIG. 3.

The method 200 then proceeds to block 290 in which the secure communication channel 130 between the smart card 110 and the contactless device 120 is terminated. In an exemplary embodiment, the smart card activation data from block 245, if applicable, is wiped from the contactless device 120 upon termination of the secure communication channel 130 between the smart card 110 and the contactless device. In an alternative exemplary embodiment, all smart card data is wiped from the contactless device 120 upon termination of the secure communication channel 130 between the smart card 110 and the contactless device.

Figure 9:
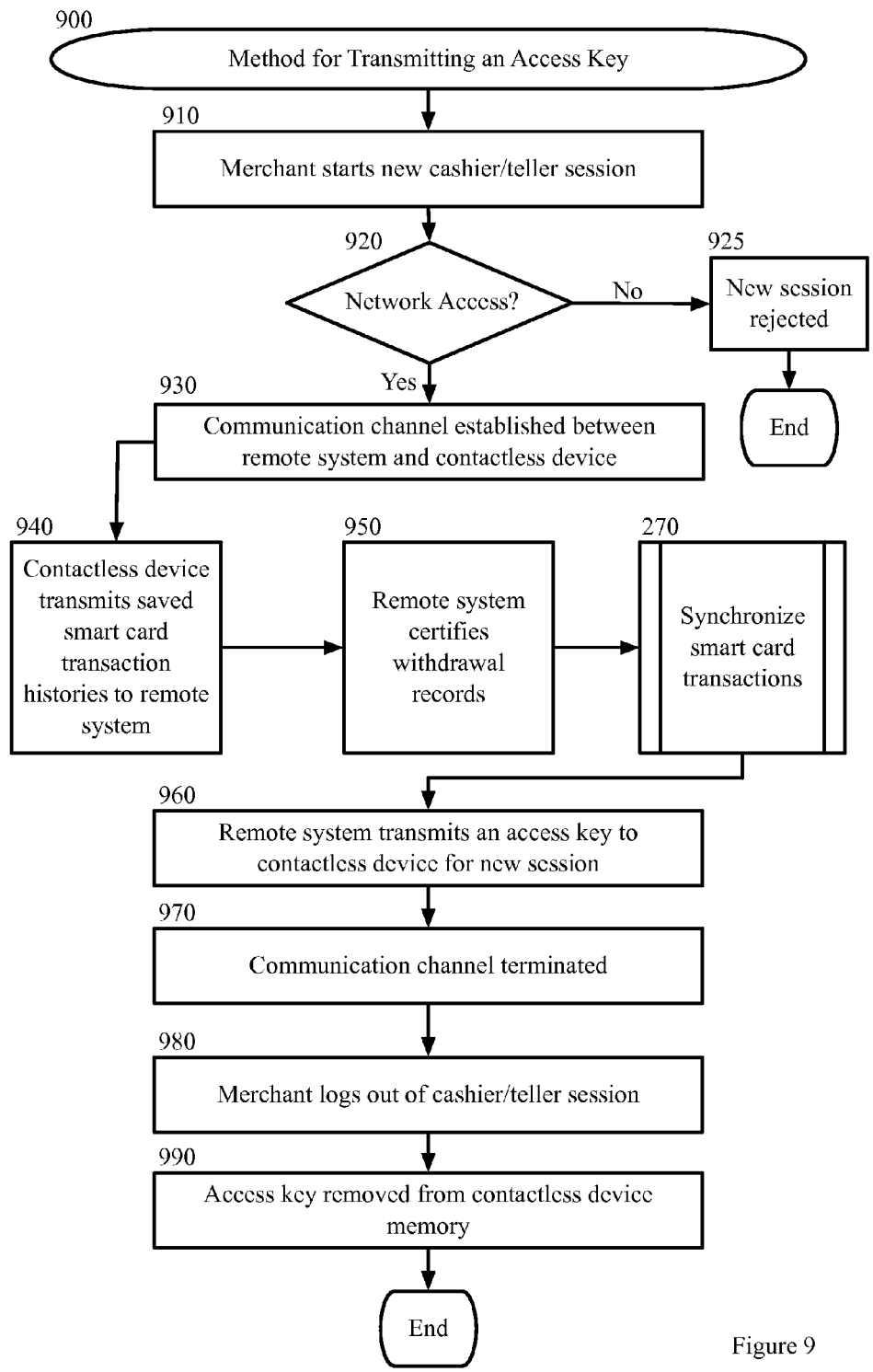
FIG. 9 is a block flow diagram depicting a method for transmitting an access key from a remote server to a contactless device according to an exemplary embodiment.

FIG. 9 is a block flow diagram depicting a method for transmitting an access key 129 to a contactless device 120 according to an exemplary embodiment. The method 900 is described with reference to the components illustrated in FIG. 1.

In an exemplary embodiment, an access key 129 resident on the contactless device 120 and/or the card reader 150 is used in combination with one or more monotonic counter 117 resident on the smart card 110 to allow for the verification of a transaction while the payment system 100 is operating offline. An exemplary payment system 100 allows for the verification of the transaction by the payment device, i.e., the contactless device 120 and/or card reader 150, instead of by the remote system 160 at the time of the transaction.

In block 910, the merchant starts a new cashier or teller session. An exemplary cashier session involves the designation of the contactless device 120 and/or card reader 150 as devices to transact a withdrawal of funds from the smart card 110. An exemplary teller session involves the designation of the contactless device 120 and/or card reader 150 as devices to transact a deposit of funds onto the smart card 110.

In an exemplary embodiment, the merchant is required to start a new session when logging onto the contactless device 120. In an alternative exemplary embodiment, the merchant is required to start a new session when a maximum number of transactions or time limit has been reached since the previous session was started.

In an exemplary embodiment, the merchant enters the session information with the user interface 121 of the contactless device. In an exemplary embodiment, a pop-up window appears after the contactless device 120 is started. In an alternative exemplary embodiment, the merchant accesses an application 122 to start a new session.

In block 920, the contactless device 120 determines whether it has network 140 access. In an exemplary embodiment, a new session must be authorized by the remote system 160 and results in the transmission of an access key 129 to the contactless device 120 and/or card reader 150. The contactless device 120 has network 140 access, to provide for such authorization and transmission.

If the contactless device 120 is without network 140 access, the new session is rejected, in block 925 and the method 900 ends.

If the contactless device 120 has network 140 access, the method 900 proceeds to block 930.

In block 930, a communication channel is established between the remote system 160 and the contactless device 120.

If the contactless device 120 has not had network 140 access and established a communication channel with the remote system 160 since performing one or more withdrawal transactions with a smart card 110, the method 900 proceeds to blocks 940, 950 and 270. The methods for withdrawing funds from a smart card 110 are described in more detail hereinafter with reference to the methods described in FIGS. 5-8.

In block 940, the contactless device 120 transmits any saved smart card 110 transaction histories and withdrawal records to the remote system 160. In an exemplary embodiment, the contactless device 120 also transmits the card identification information to the remote system 160.

In block 950, the remote system 160 certifies the withdrawal records transmitted by the contactless device 120. In an exemplary embodiment, the remote system 160 certifies the withdrawal records using the cashier signing key 167 resident on the remote system 160. The cashier signing key verifies the session information contained in withdrawal record as signed by cashier access key 129 resident on the contactless device 120 at the time the withdrawal record was created. In an exemplary embodiment, the cashier signing key 167 is utilized to authenticate and certify data contained in the withdrawal record by the remote system 160. Once the cashier signing key 167 certifies the withdrawal record, a notation is made onto the record for future access/reading by a contactless device 120 or card reader 150 with a valid access key 129 or 159.

After the smart card 110 transactions are transmitted to the remote system 160, the remote system 160 analyzes and synchronizes the transactions, in block 270, which is similar to the block 270 referenced in FIG. 2. In an exemplary embodiment, this action occurs in real-time with (in other words, immediately after) the transmission of the transactions to the remote system 160. In an alternative exemplary embodiment, this action occurs at a later time or at a set durational time period (for example, once every 24 hours). The method 270 of synchronizing smart card 110 transactions on the remote system 160 is described in more detail hereinafter with reference to the methods described in FIG. 7.

In an exemplary embodiment, a transaction made by mistake, may be reverted by a merchant. The merchant sends the original transaction identification to the remote system 160 and requests reversion of the transaction. In an exemplary embodiment, the remote system 160 creates a new transaction for the same amount, but as an opposite type of transaction (for example, to revert a withdrawal, the transaction type would be a deposit). The original transaction is still maintained in the transaction history, but the smart card 110 balance is corrected the next time the smart card is connected to a contactless device 120 with network 140 access to the remote system 160.

If the no withdrawal transactions have occurred since the last session was started by the contactless device 120, the method 900 proceeds directly to block 960

In block 960, the remote system 160 authenticates the contactless device 120 and transmits an access key 129 for the new session. In an exemplary embodiment, the merchant designates whether the contactless device 120 will be used for deposit or withdrawal transactions by entering the correct session designation into the user interface 121 on the contactless device 120. In an alternative exemplary embodiment, the merchant designates the contactless device 120 as performing both types of transactions. In an additional alternative exemplary embodiment, the merchant does not designate a type of session and the contactless device 120 is designated for a particular session type or both types of sessions by the remote system 160.

In an exemplary embodiment, the appropriate session access key 129 is transmitted to the contactless device 120 by the remote system 160. The remote system 160 maintains a log of which session access key 129 is transmitted to each contactless device 120. In an exemplary embodiment, the log contains a list of each session access key 129 transmitted to the contactless device 120 over a period of time. The remote system 160 can access the log to cross-reference the deposit/withdrawal records and determine which contactless device 120 created each record. In an exemplary embodiment, this may also allow the remote system 160 to determine the date, time, location, and/or merchant name that created the record.

In block 970, the communication channel between the contactless device 120 and the remote system 160 is terminated. In an exemplary embodiment, a contactless device 120 that is designated for deposit transactions and has received a teller session access key 129 will remain connected to the remote system 160 for the duration of the session. Because deposit transactions require network access, the contactless device 120 will not terminate the communication channel. Upon termination of the communication channel, the session is ended and a new session key is required to conduct additional transactions. In an alternative exemplary embodiment, the contactless device 120 may terminate the communication channel with the remote system 160 and re-establish a connection prior to conducting a deposit transaction without requiring a new session key.

In an exemplary embodiment, a contactless device 120 that is designated for withdrawal transactions and has received a cashier session access key 129 may terminate the communication channel at any time during the session. Because withdrawal transactions do not require network access, the contactless device 120 may terminate the communication channel at any time without requiring a new session key to conduct the withdrawal transactions.

In an exemplary embodiment, the session access key 129 transmitted to the contactless device 120 is used until the merchant logs out of the device or ends the session. In an alternative exemplary embodiment, the session access key 129 has a defined duration, geographical perimeter, and/or maximum number of transactions quota that may also terminate the session key.

In block 980, the merchant logs out of the contactless device 120, ends the session, or otherwise terminates the session access key 129. In an exemplary embodiment, one or more transactions may occur, as described in more detail in this specification, with reference to the methods described herein before the session is terminated.

In block 990, the session access key 129 is removed from the contactless device 120. In an exemplary embodiment, the session access key 129 is wiped from the contactless device 120 memory when the session is terminated. In an exemplary embodiment, the session access key is not written to the device. Instead, the device is briefly stored in the memory of the device 120 and is removed upon termination of the session to prevent a malicious actor from reading the access key data is the contactless device 120 is compromised or not running.

Figure 3:
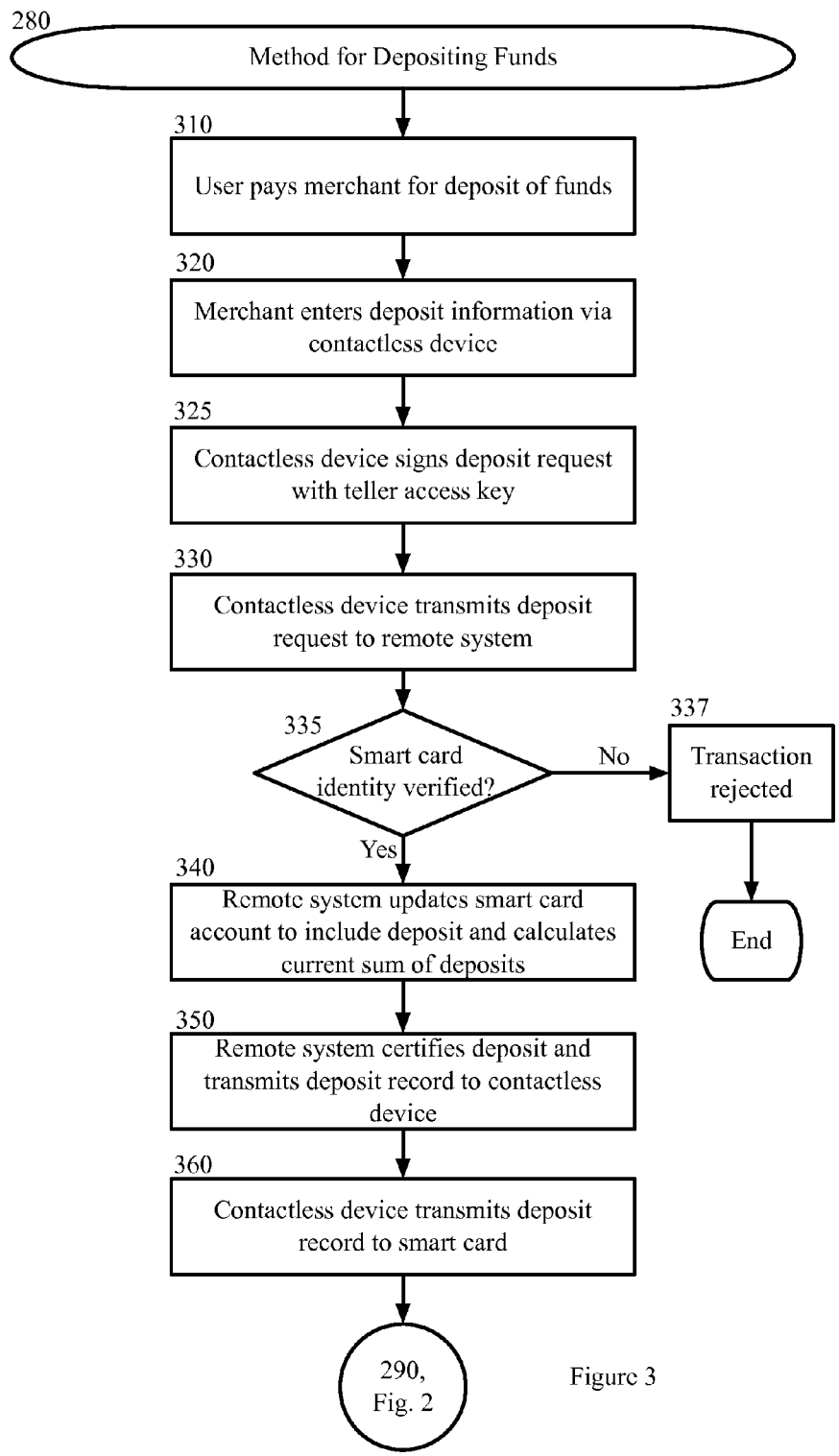
FIG. 3 is a block flow diagram depicting a method for depositing funds to a smart card via a contactless device according to an exemplary embodiment.

FIG. 3 is a block flow diagram depicting a method for depositing funds to a smart card 110 via a contactless device 120 according to an exemplary embodiment, as referenced in block 280 of FIG. 2. The method 280 is described with reference to the components illustrated in FIG. 1.

In block 310, the user pays the merchant for the deposit of funds. In an exemplary embodiment, the payment is a cash payment. In an alternative exemplary embodiment, the payment is a credit card payment or other electronic payment. In this embodiment, payment may be made using a contactless tap of the credit card to the contactless device or by swiping the credit card or other card with a credit card reader.

The merchant enters the deposit information into the contactless device 120, in block 320. In an exemplary embodiment, the merchant enters the deposit information with the user interface 121 of the contactless device. In an exemplary embodiment, a pop-up window appears after the smart card 110 transaction history is transmitted to the remote system 160. In an alternative exemplary embodiment, the merchant accesses an application 122 to enter the deposit information.

In block 325, the contactless device creates a deposit request and signs the request with the teller access key 129. In an exemplary embodiment, the teller access key 129 was transmitted to the contactless device 120 prior to the start of a new session, as described above with reference to FIG. 9. In an exemplary embodiment, a signature by the teller access key 129 identifies the merchant, contactless device 120, date, time and/or location where the deposit request was created. Because of the access/permission limitations of the teller access key 129, the contactless device 120 cannot write deposit data to the smart card 110. Instead, the contactless device 120 creates a deposit request that must be certified by the remote system 160 before the deposit of funds are available for use by the smart card 110. In an alternative exemplary embodiment, the deposit request is maintained in the transaction history of smart card 110 and may be accessed/read by a contactless device 120 during future transactions.

In block 330, the contactless device transmits a deposit request to the remote system 160 via a network 140. In an exemplary embodiment, the deposit request comprises the deposit amount, smart card identification information, a timestamp, and the merchant identification. In an exemplary embodiment, the smart card identification information includes the card account number and the card verification number. In an exemplary embodiment, the card identification information is encoded in the smart card data transmitted to or read by the contactless device 120 in block 230. In an exemplary embodiment, the deposit request also includes the teller access key 129 signature, which is readable by the remote system 160 and may denote the date, time, location, merchant name and/or contactless device 120 that created the deposit request.

In block 335, the remote system 160 verifies the identity of the smart card. In an exemplary embodiment, the remote system 160 is capable of identifying the smart card 110 from the data transmitted in the deposit request. The remote system 160 cross-references the card account number and the card verification number to confirm the correct card verification number is encoded by in the card identification data. In an alternative exemplary embodiment, the remote system 160 maintains network 140 access to the contactless device 120 and has already confirmed the identity of the smart card 110 in block 230 (FIG. 2).

If the identity of the smart card 110 is not verified, the transaction is rejected in block 337 and the method 280 ends.

If the identity of the smart card 110 is verified, the method 280 proceeds to block 340. In block 340, the remote system 160 updates the account associated with the smart card 110 to include the deposit of funds and calculates a new sum of deposits for the smart card 110. In this regard and as described herein with reference to the records of the smart card 110 maintained by the remote system 160, the remote system 160 can maintain an account for each smart card 110. Each account for a particular smart card 110 can comprise one or more of information maintained on the smart card 110, user registration information, transaction history, and other information for maintaining the smart card 110. The remote system 160 can store each account record in the database 161.

In block 350, the remote system 160 authorizes and certifies the deposit using the teller signing key 167 and transmits the deposit record to the contactless device 120. In an exemplary embodiment, the remote system 160 reviews the signed deposit request and authorizes the teller access key 129 signature. The remote system 160 accesses a master key to confirm that authenticity of the teller access key 129 signature. In an alternative exemplary embodiment, the remote systems 160 may review additional details, such as the number of transactions performed during the session, any geographic location restraints, any restrictions on size or amount of deposit allowed, and/or any additional possible restraints placed on the teller access key 129 to confirm the key is active.

In block 360, the contactless device 120 transmits the deposit record to the smart card 110. In an exemplary embodiment, the deposit record comprises the new sum of deposits, the card identification, a time stamp, a merchant identification, a signature by the teller access key 129 and certification by the teller signing key 167. In an exemplary embodiment, the contactless device 120 writes the certified deposit record to the smart card 110 using the teller access key 129.

From block 360, the method 280 proceeds to block 290 (FIG. 2).

In an alternative embodiment, the user may deposit funds to the remote system 160 using a computer (not illustrated) and network 140. In this embodiment, the user makes a payment of funds to the remote system 160, and the remote system 160 associates the funds with the account corresponding to the particular smart card 110 in the possession of the user, based on identification information of the smart card 110. The user can deposit funds to the remote system 160 using any electronic payment method accepted by the remote system 160 and available to the user via the computer operated by the user. The funds are not stored on the smart card 110 until the user taps the smart card 110 with a contactless device 120, where the contactless device 120 has communication access with the remote system 160 via the network 140. Blocks 310-340 may be omitted from the method 280, and the funds may be deposited on the smart card 110 by following blocks 350-360 upon identification of the smart card 110 to the remote system 160 by the contactless device 120. For example, after the transaction history is communicated to the remote system 160 at block 260, the remote system 160 confirms the identity of the smart card 110 using the card account number and card verification number and then transmits a deposit record to the contactless device 120 at block 350.

FIG. 5 is a block flow diagram depicting a method 500 for processing a withdrawal of funds from a smart card 110 via a contactless device 120 according to an exemplary embodiment. The method 500 is described with reference to the components illustrated in FIG. 1.

In an exemplary embodiment, a withdrawal transaction does not require remote system 160 authorization. The contactless device 120 may or may not have network 140 access at the time of the transaction.

In block 510, the user "taps" the smart card 110 in the proximity of the contactless device 120. In an exemplary embodiment, the card reader 150 that reads information from the smart card 110 is a part of the contactless device 120. In an alternative exemplary embodiment, the card reader 150 is a separate stand-alone device in communication with a computer, such as the contactless device 120.

In an exemplary embodiment, the contactless device 120 generates a radio frequency (RF) or other field polling for the presence of a smart card 110, and the user "taps" the smart card 110 by placing the card 110 within the field of the contactless device 120. In an alternative exemplary embodiment, the merchant activates the RF field or other field to poll for the presence of a smart card 110 using an application 155 on the card reader 150. In certain exemplary embodiments, the systems and methods described in FIGS. 5-6 herein are performed while the smart card 110 is tapped.

The contactless device 120 detects the smart card 110 and establishes a secure communication channel 130 in block 515. In an exemplary embodiment, the secure communication channel 130 is an NFC communication channel.

The contactless device 120 identifies the smart card 110, in block 270, which is similar to the block 230 referenced in FIGS. 2 and 8.

If the identity of the smart card 110 is not verified, the transaction is rejected and the method 500 ends.

If the identity of the smart card 110 is verified, the method 500 proceeds to block 525 (FIG. 5).

Returning to FIG. 5, in block 525, the smart card 110 transmits the entire saved transaction history from its memory 113 to the contactless device 120. In an exemplary embodiment, the smart card 110 transmits all deposit and withdrawal transactions to the contactless device 120. If the amount of the transactions exceeds the storage/memory 113 capabilities of the smart card 110, the oldest transactions are dropped from the smart card memory 113. In an exemplary embodiment, the smart card 110 alternatively or additionally transmits the sum of deposits and the sum of withdrawals for all previous transactions to the contactless device 120. In an alternative exemplary embodiment, the smart card 110 transmits the last deposit transaction and the entire saved withdrawal transaction history from its memory 113 to the contactless device 120. If the amount of withdrawals exceeds the storage/memory 113 capability of the smart card 110, the oldest transactions are dropped from the smart card memory 113. In an exemplary embodiment, the transmission of the withdrawal history includes the last several withdrawal transactions to ensure if a particular contactless device 120 doesn't come back online its transactions still get transmitted to the remote system 160.

In block 530, the contactless device 120 determines whether the smart card 110 has a sufficient balance for the transactions. The method of determining the balance of funds on a smart card 110 is described in more detail hereinafter with reference to the methods described in FIG. 6.

Figure 6:
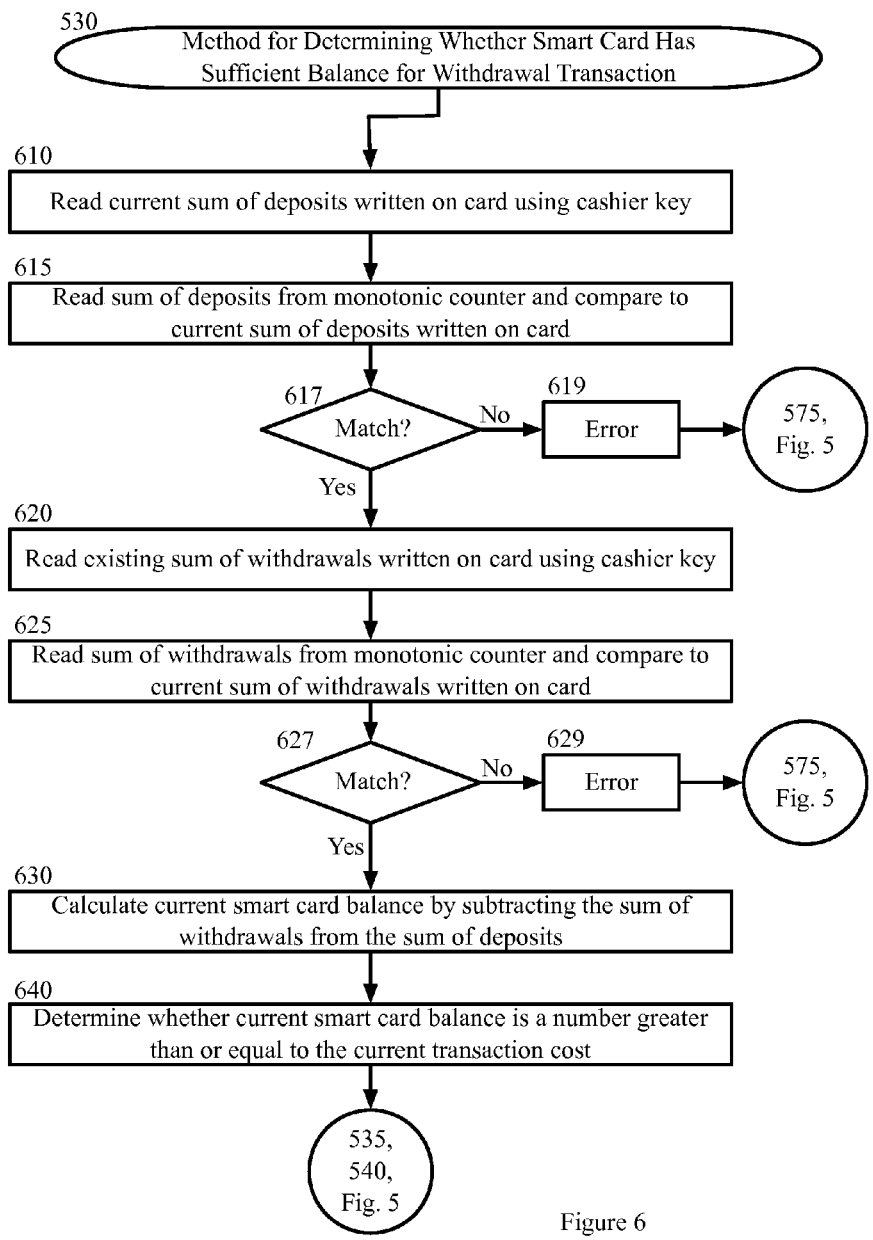
FIG. 6 is a block flow diagram depicting a method for determining whether a smart card has a sufficient balance of funds for a withdrawal transaction according to an exemplary embodiment.

FIG. 6 is a block flow diagram depicting a method 530 for determining whether a smart card 110 has a sufficient balance of funds for a withdrawal transaction according to an exemplary embodiment. The method 530 is described with reference to the components illustrated in FIG. 1.

In an exemplary embodiment, determining the smart card 110 balance will require the transmission of the entire transaction history in block 525 (FIG. 5) and the transmission of the monotonic counter 117 in block 820 (FIG. 8). In an alternative exemplary embodiment, it may be difficult to determine the smart card 110 balance using the remote system 160 records, since a withdrawal may or may not occur when the contactless device 120 has network access to the remote system 160. Therefore, the sum of deposits and sum of withdrawals will be calculated and saved on the smart card 110 may be at least a part of the transaction history stored on the smart card 110.

In block 610, the contactless device 120 reads the current sum of deposits from the smart card 110. In an exemplary embodiment, the contactless device 120 contains the entire transaction history transmitted from the smart card 110, at block 525 (FIG. 5) and calculates the sum of deposits using the transaction history. In an alternative exemplary embodiment, the transaction history includes a current sum of deposits. In this embodiment, the contactless device 120 reviews the current sum of deposits entry from the transaction history.

In block 615, the contactless device 120 reads the monotonic counter 117 and compares this to the sum of deposits calculated in block 610. In an exemplary embodiment, the monotonic counter 117 contains the sum of deposits. The contactless device 120 is capable of reading the data contained in the monotonic counters 117, but is incapable or writing or otherwise changing this data. Because the sum of deposit is store in the monotonic counter (which can only be incremented, not decreased), a smart card 110 that has been rolled back to a previous state can be detected and inactivated.

In block 617, the sum of deposits calculated in block 610 and the sum of deposits read from the monotonic counter 117 in block 615 are compared. In an alternative exemplary embodiment, a monotonic counter 117 is increased during each deposit transaction and the total number of deposit transactions saved in the transaction history is compared to the number designated by the monotonic counter 117.

If the number do not match, an error is indicated in block 619 and the method 530 proceeds to block 575 in FIG. 5.

If the numbers do match, the method 530 proceeds to block 620.

In block 620, the contactless device 120 reads the current sum of withdrawals from the smart card 110. In an exemplary embodiment, the contactless device 120 contains the entire transaction history transmitted from the smart card 110, at block 525 (FIG. 5) and calculates the sum of withdrawals using the transaction history. In an alternative exemplary embodiment, the transaction history includes the sum of withdrawals. In this embodiment, the contactless device 120 reviews the current sum of withdrawals from the transaction history.

In block 625, the contactless device 120 reads the monotonic counter 117 and compares this to the sum of withdrawals calculated in block 620. In an exemplary embodiment, the monotonic counter 117 contains the sum of withdrawals. The contactless device 120 is capable of reading the data contained in the monotonic counters 117, but is incapable or writing or otherwise changing this data. Because the sum of withdrawals is store in the monotonic counter (which can only be incremented, not decreased), a smart card 110 that has been rolled back to a previous state can be detected and inactivated.

In block 627, the sum of withdrawals calculated in block 620 and the sum of withdrawals read from the monotonic counter 117 in block 625 are compared. In an alternative exemplary embodiment, a monotonic counter 117 is increased during each withdrawal transaction and the total number of withdrawal transactions saved in the transaction history is compared to the number designated by the monotonic counter 117.

In an exemplary embodiment, the remote system 160 will have the current sum of deposits, since these transactions are completed while the contactless device 120 has network 140 access to the remote system 160. The remote system 160 may not have the current sum of withdrawals, since the contactless device 120 may or may not have network 140 access to the remote system 160 at the time of the transaction, but the remote system 160 will have the sum of withdrawals at the time of the last synchronization. The contactless device 120 reads the current sum of withdrawals by reading the last withdrawal transaction from the smart card 110 and the current sum of deposits by reading the last deposit transaction from the smart card 110.

If the number do not match, an error is indicated in block 626 and the method 530 proceeds to block 575 in FIG. 5.

If the numbers do match, the method 530 proceeds to block 630.

In block 630, the contactless device 120 calculates the current smart card 110 balance. In an exemplary embodiment, the balance is calculated by subtracting the sum of withdrawals from the sum of deposits. In an exemplary embodiment, the contactless device 120 can calculate the lower boundary of the card balance. For example:

Balance≥last known sum of deposits−last known sum of withdrawals

For example, using the following transaction history:

| A new card is created with zero balance | +, 0→0 |
| | −, 0→0 |
| Deposit 20 | +, 0→20 |
| Withdraw 4 | −, 0→4 |
| Withdraw 8 | −4→12 |
| Deposit 10 | +20→30 |
| Withdraw 7 | −, 12→19 |
| Withdraw 2 | −, 19→21 | the current card balance can be calculated using the last deposit and withdrawal transactions:
+,20→30
−,19→21
Balance=30−21=9

In block 640, the contactless device 120 determines whether the smart card 110 balance is a number greater than or equal to the current transaction cost. In an exemplary embodiment, the smart card 110 balance may not be a negative number (in other words, the smart card 110 may not become overdrawn).

In an alternative exemplary embodiment, the smart card 110 calculates and stores a balance in the memory 113 after each transaction. In yet another exemplary embodiment, the smart card 110 stores a running list of all transactions and the balance is calculated by adding/subtracting each transaction as appropriate.

From block 640, the method 530 proceeds to block 540 or block 535 (FIG. 5).

Returning to FIG. 5, if the contactless device 120 determines in block 530 that the smart card 110 does not have a sufficient balance for the transaction, the transaction is rejected in block 535, and the secure communication channel 130 is terminated.

If the contactless device 120 determines in block 530 that the smart card 110 has a sufficient balance for the transaction, the contactless device 120, the method proceeds to block 537.

In block 537, the contactless device creates a withdrawal record and signs the record with the cashier access key 129. In an exemplary embodiment, the cashier access key 129 was transmitted to the contactless device 120 prior to the start of a new session, as described above with reference to FIG. 9. In an exemplary embodiment, a signature by the cashier access key 129 identifies the merchant, contactless device 120, date, time and/or location where the withdrawal record was created. Because of the access/permission limitations of the cashier access key 129, the withdrawal record must be certified by the remote system 160. In an exemplary embodiment, the withdrawal record is maintained in the transaction history of smart card 110 and may be accessed/read by a contactless device 120 during future transactions.

In block 540, the contactless device 120 transmits the signed withdrawal record to the smart card 110. In an exemplary embodiment, the contactless device 120 writes the withdrawal record to the smart card 110 using the cashier access key 129. In an exemplary embodiment, the contactless device 120 writes a new transaction record to the smart card 110 illustrating the recent withdrawal transaction. The withdrawal transaction record comprises the transaction amount and a new sum of withdrawals as calculated by the contactless device 120. In an exemplary embodiment, the contactless device 120 creates a new withdrawal record and adds the record to the transaction history previously transmitted from the smart card 110 at block 525. In an exemplary embodiment, the withdrawal record also can comprise the smart card identification, a time stamp, the merchant identification, the amount of the withdrawal, the cashier access key 129 signature and other suitable information. In an exemplary embodiment, the smart card identification can comprise the card account number and the card verification number.

In an exemplary embodiment, the contactless device 120 increments the monotonic counter 117 resident on the smart card 110. In an exemplary embodiment, the session access key 129 resident on the contactless device 120 is utilized to increment the monotonic counter 117. In an exemplary embodiment, the monotonic counter 117 may be incremented by the amount of the withdrawal transaction. In an alternative exemplary embodiment, the monotonic counter 117 may be incremented by a fixed number representing the withdrawal transaction. For example, for each withdrawal transaction, the monotonic counter 117 may be incremented by one. In an exemplary embodiment, the monotonic counter 117 is capable only of being increased, not decreased.

In an exemplary embodiment, a different contactless device 120 cannot verify a withdrawal record signed by another contactless device 120. Each cashier access key 129 is unique to a particular contactless device 120 and not capable of being read by or verified by a different contactless device 120. Therefore, certification by the cashier signing key 167 resident only on the remote system 160 is required to verify a withdrawal transaction.

From block 540, the method 500 proceeds to block 545. In block 545, the contactless device 120 indicates that the transaction was successful, and the secure communication channel 130 is terminated, in block 550.

In block 560, the contactless device 120 determines whether it has network 140 access to the remote system 160. If the contactless device 120 does not have network 140 access, the contactless device 120 stores the smart card 110 identification information and transaction history (including the newly-added record) until network 140 access is available.

If the contactless device 120 has network 140 access, the contactless device 120 establishes a communication channel with the remote system 160, in block 565.

In block 570, the contactless device 120 transmits the card identification information, any signed withdrawal records and the transaction history to the remote system 160. In an exemplary embodiment, the withdrawal transaction occurs when the contactless device 120 has network 140 access, allowing for simultaneous transmission of the smart card 110 transaction history to the remote system 160. In this embodiment, the remote system 160 may perform the identification of the smart card in block 520. In an alternative embodiment, the withdrawal transaction occurs when the contactless device 120 is without network 140 access. In this embodiment, the contactless device 120 may perform the identification of the smart card in block 520 and store the card identification information and transaction history to be transmitted to the remote system 160 at a later time.

In block 573, the remote system 160 authorizes and certifies the withdrawal record using the cashier signing key 167. In an exemplary embodiment, the remote system 160 reviews the signed withdrawal request and authorizes the cashier access key 129 signature. The remote system 160 accesses a master key to confirm that authenticity of the cashier access key 129 signature. In an alternative exemplary embodiment, the remote systems 160 may review additional details, such as the number of transactions performed during the session, any geographic location restraints, any restrictions on size or amount of withdrawals allowed, and/or any additional possible restraints placed on the cashier access key 129 to confirm the key is active.

In an exemplary embodiment, the withdrawal transaction occurred while the contactless device 120 had network 140 access and the contactless device 120 transmits the certified withdrawal record to the smart card 110. In an alternative exemplary embodiment, the withdrawal transaction occurred offline, without network 140 access and the certified withdrawal record is not transmitted to the smart card 110 until the next transaction that occurs during network 140 access. In an exemplary embodiment, the certified withdrawal record comprises the new sum of withdrawals, the card identification, a time stamp, a merchant identification, a signature by the cashier access key 129 and certification by the cashier signing key 167.

After the withdrawal transactions are certified, the remote system 160 analyzes and synchronizes the transactions, in block 270, which is similar to the block 270 referenced in FIG. 2. In an exemplary embodiment, this action occurs in real-time with (in other words, immediately after) the transmission of the transactions to the remote system 160. In an alternative exemplary embodiment, this action occurs at a later time or at a set durational time period (for example, once every 24 hours). The method 270 of synchronizing smart card 110 transactions on the remote system 160 is described in more detail hereinafter with reference to the methods described in FIG. 7.

In an exemplary embodiment, a transaction made by mistake, may be reverted by a merchant. The merchant sends the original transaction identification to the remote system 160 and requests reversion of the transaction. In an exemplary embodiment, the remote system 160 creates a new transaction for the same amount, but as an opposite type of transaction (for example, to revert a withdrawal, the transaction type would be a deposit). The original transaction is still maintained in the transaction history, but the smart card 110 balance is corrected the next time the smart card is connected to a contactless device 120 with network 140 access to the remote system 160.

In block 575, the secure communication channel is terminated, and the method 500 ends.

Figure 7:
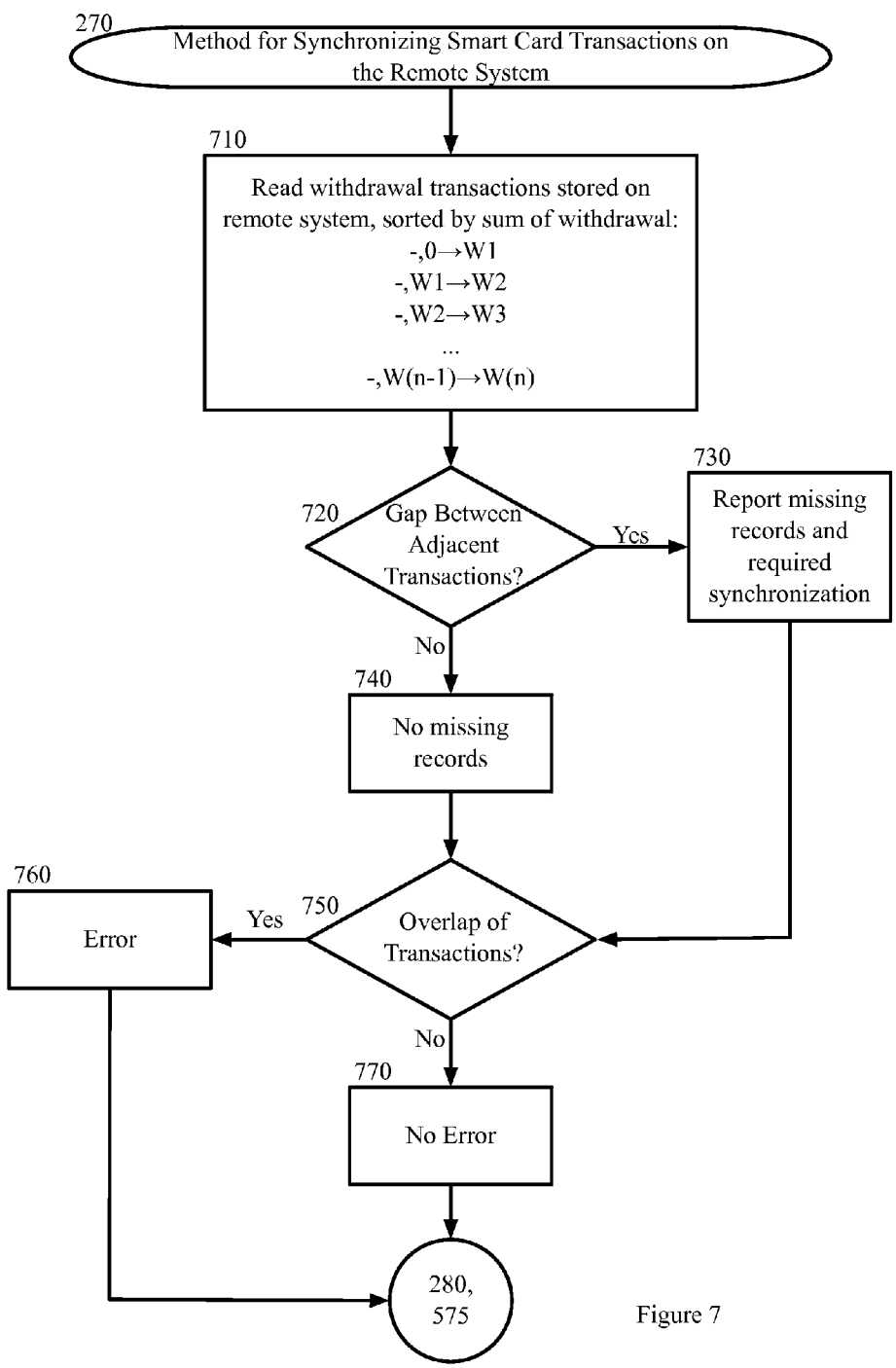
FIG. 7 is a block flow diagram depicting a method for synchronizing smart card transactions on a remote system according to an exemplary embodiment.

FIG. 7 is a block flow diagram depicting a method for synchronizing smart card 110 transactions on a remote system 160 according to an exemplary embodiment, as referenced in block 270 of FIGS. 2 and 5. The method 270 is described with reference to the components illustrated in FIG. 1.

The remote system 160 performs an analysis and synchronization of the smart card 110 transaction history received from the contactless device 120. In an exemplary embodiment, the remote system 160 performs the analysis when the transaction history is transmitted. In an alternative exemplary embodiment, the analysis is performed at set time intervals (for example, once every 24 hours). Because the deposit transactions are completed with network 140 access, an analysis of the deposit transactions is not required, as those deposit transactions are updated in the remote system 160 in real-time. In an alternative exemplary embodiment, an analysis of the withdrawal and deposit transactions is performed.

In block 710, the remote system 160 reads the withdrawal transactions, sorted by the sum of withdrawals. For example, in an exemplary embodiment:

-,0→W1
-,W1→W2
-,W2→W3
. . .
-,W(n−1)W(n), where "W" is a withdrawal transaction.

In block 720, the remote system 160 determines whether a gap exists between adjacent withdrawal transactions.

If a gap exists between adjacent transactions, the remote system 160 determines whether transaction records are missing and a synchronization is needed, in block 730. For example, the following sum of withdrawal records indicate a missing transaction:

-,0→4
-,4→12
-,19→21 (missing transaction between 12 and 19).

Thus, the remote system 160 has information indicating the current sum of withdrawals for the smart cart 110 (which sum is 21), even though the remote system 160 does not have a transaction record (-,12→19) corresponding to the withdrawal of 7 from the smart card 110. This missing record scenario is indicative of an offline transaction (-,12→19) occurring between two online transactions (-,4→12 and -,19→21). Alternatively, one or both of the transactions bounding the missing transaction could have occurred offline and have since been communicated to the remote system 160 when the corresponding contactless device 120 obtained network 140 access to the remote system 160. Additionally, because the sum of withdrawals maintained on the card is current, even after an offline transaction, the balance of the card can be determined at the point of sale for the next merchant.

Synchronization will occur when the transaction record for the missing transaction is communicated to the remote system 160, which occurs when the corresponding contactless device 120 obtains network 140 access to the remote system 160. Then, the remote system 160 can analyze the transaction history to determine that all transaction records are included.

The sum of deposits could be analyzed in a similar manner if a deposit transaction is allowed to be performed offline.

From block 730, the method 270 proceeds to block 750.

Referring back to block 720, if a gap does not exist in adjacent transactions, the remote system 160 determines all records are present in block 740. From block 740, the method 270 proceeds to block 750.

In block 750, the remote system 160 determines whether overlapping transactions exist in the transaction history for the smart card 110.

If overlapping transactions exist, the remote system 160 determines an error has occurred (for example, a withdrawal occurred without writing a record to the smart card 110), in block 760. For example, the following illustrates an overlapping transaction:
 −,0→4
 −,4→12
 −,4→8 (overlapping transaction as two transactions begin with a sum of withdrawals of −4).

If an overlapping transaction exists, the method 270 proceeds to block 760 in which the remote system 160 reports an error in the transaction history for the smart card 110 and deactivates the smart card 110 from further use.

Referring back to block 750, if overlapping transactions do not exist, the method 270 proceeds to block 770. In block 770, the remote system 160 determines errors do not exist.

From blocks 760 or 770, the method 270 proceeds to block 280 of FIG. 2 or block 575 of FIG. 5, as appropriate.

In an exemplary embodiment, the remote system 160 maintains a list of blocked (deactivated) smart cards 110. The device reader 150 and contactless device 120 receive a list of blocked smart cards 110 when connected to the remote system 160. Transaction requests from a blocked smart card 110 are rejected.

General

Users may be allowed to limit or otherwise affect the operation of the features disclosed herein. For example, users may be given opportunities to opt-in or opt-out of the collection or use of certain data or the activation of certain features. In addition, users may be given the opportunity to change the manner in which the features are employed, including for situations in which users may have concerns regarding privacy. Instructions also may be provided to users to notify them regarding policies about the use of information, including personally identifiable information, and manners in which each user may affect such use of information. Thus, information can be used to benefit a user, if desired, through receipt of relevant advertisements, offers, or other information, without risking disclosure of personal information or the user's identity.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as the act may be performed by more than one computer.

The exemplary systems, methods, and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for providing offline payment processing of purchases, comprising:

receiving, by a mobile communication device via a network connection with a computer managing smart card device accounts, smart card device account numbers and corresponding verification numbers for a plurality of smart card devices;

terminating, by the mobile communication device, the network connection to the computer managing the smart card device accounts;

establishing, by the mobile communication device, a communication channel with a smart card device while the mobile communication device is without a network connection to the computer managing the smart card device accounts;

receiving, by the mobile communication device and from the smart card device while the mobile communication device is without a network connection to the computer managing the smart card device accounts, a smart card device account number, a verification number, and a transaction history comprising a listing of previous deposit transactions and a listing of previous withdrawal transactions;

calculating, by the mobile communication device while the mobile communication device is without a network connection to the computer managing the smart card device accounts, an amount of previous withdrawals using the listing of previous withdrawal transactions and an amount of previous deposits using the listing of previous deposit transactions; and authorizing, by the mobile communication device while the mobile communication device is without a network connection to the computer managing the smart card device accounts, an offline transaction with the smart card device by determining that the smart card device account number and the verification number received from the smart card device matches a smart card device account number and a corresponding verification number received from the computer managing the smart card device accounts and by determining that a current transaction amount is less than or equal to a difference between the amount of previous deposits and the amount of the previous withdrawals.

2. The computer-implemented method of claim 1, further comprising establishing the communication channel using a near field communication (NFC) protocol.

3. The computer-implemented method of claim 1, wherein the mobile communication device comprises a mobile telephone.

4. The computer-implemented method of claim 1, wherein the mobile communication device comprises a stand-alone card reader.

5. The computer-implemented method of claim 1, further comprising writing, by the mobile communication device, a transaction record to the smart card device transaction history indicating the current transaction amount debited from the smart card device account balance.

6. The computer-implemented method of claim 1, further comprising:

establishing, by the mobile communication device, a second network connection with the computer managing the smart card device accounts after completing the offline debit transaction with the smart card device without the network connection to the computer; and transmitting, by the mobile communication device, the smart card device account number, the transaction history, and the transaction record to the computer managing the smart card device accounts via the network connection to update the smart card device account managed by the computer.

7. The computer-implemented method of claim 4, further comprising:

authorizing by the mobile communication device while the mobile communication device is without a network connection to the computer managing the smart card device accounts, a deposit transaction to credit a transaction amount to the smart card device;

establishing, by the mobile communication device, a network connection with the computer managing the smart card device accounts;

transmitting, by the mobile communication device and to the computer managing the smart card device accounts, a deposit request comprising the smart card device account number and an amount of the deposit transaction;

receiving, by the mobile communication device and from the computer managing the smart card device accounts, a deposit record comprising the amount of the deposit; and writing, by the mobile communication device, a deposit record to the smart card device transaction history indicating an amount added to the smart card device account balance.

8. A computer program product, comprising:

a non-transitory computer-readable medium having computer-readable program instructions embodied therein that when executed by a mobile computing device cause the mobile computing device to perform the steps of:

receiving, via a network connection with a computer managing smart card device accounts, smart card device account numbers and corresponding verification numbers for a plurality of smart card devices;

terminating the network connection to the computer managing the smart card device accounts;

establishing a communication channel with a smart card device while the mobile communication device is without a network connection to the computer managing the smart card device accounts;

receiving, from a smart card device while the mobile communication device is without a network connection to the computer managing the smart card device accounts, a smart card device account number, a verification number, and a transaction history comprising a listing of previous deposit transactions and a listing of previous withdrawal transactions;

calculating, while the mobile communication device is without a network connection to the computer managing the smart card device accounts, an amount of previous withdrawals using the listing of previous withdrawal transactions and an amount of previous deposits using the listing of previous deposit transactions; and authorizing, while the mobile communication device is without a network connection to the computer managing the smart card device accounts, an offline transaction with the smart card device by determining that the smart card device account number and the verification number received from the smart card device matches a smart card device account number and a corresponding verification number received from the computer managing the smart card device accounts and by determining that a current transaction amount is less than or equal to a difference between the amount of previous deposits and the amount of the previous withdrawals.

9. The computer program product of claim 8, further comprising the step of:

writing a transaction record to the smart card device transaction history indicating the current transaction amount debited from the smart card device account balance.

10. The computer program product of claim 9, further comprising the steps of:

establishing a second network connection with the computer managing the smart card device accounts after completing the offline debit transaction with the smart card device without the network connection to the computer; and transmitting the smart card device account number, the transaction history, and the transaction record to the computer managing the smart card device accounts via the network connection to update the smart card device account managed by the computer.

11. The computer program product of claim 8, further comprising the steps of:

authorizing without a network connection to the computer managing the smart card device accounts a deposit transaction to credit a transaction amount to the smart card device;

establishing a network connection with the computer managing the smart card device accounts;

transmitting to the computer managing the smart card device accounts a deposit request comprising the smart card device account number and an amount of the deposit transaction;

receiving from the computer managing the smart card device accounts a deposit record comprising the amount of the deposit; and writing the deposit record to the smart card device transaction history indicating an amount added to the smart card account balance.

12. A system for processing withdrawals of funds during offline payment processing of purchases, comprising:

a processor; and a storage device comprising hardware storing executable instructions that when executed by the processor cause the processor to execute the steps of:

receiving, via a network connection with a computer managing smart card device accounts, smart card device account numbers and corresponding verification numbers for a plurality of smart card devices;

terminating the network connection to the computer managing the smart card device accounts;

establishing a communication channel with a smart card device without a network connection to the computer managing the smart card device accounts;

receiving, from the smart card device without a network connection to the computer managing the smart card device accounts, a smart card device account number, a verification number, and a transaction history comprising a listing of previous deposit transactions and a listing of previous withdrawal transactions;

calculating, without a network connection to the computer managing the smart card device accounts, an amount of previous withdrawals using the listing of previous withdrawal transactions and an amount of previous deposits using the listing of previous deposit transactions; and authorizing, without a network connection to the computer managing the smart card device accounts, an offline transaction with the smart card device by determining that the smart card device account number and the verification number received from the smart card device matches a smart card device account number and a corresponding verification number received from the computer managing the smart card device accounts and by determining that a current transaction amount is less than or equal to a difference between the amount of previous deposits and the amount of the previous withdrawals.

13. The system of claim 12, wherein the processor is further configured to execute instructions stored in the storage device to cause the processor to execute the step of:

writing a transaction record to the smart card device transaction history indicating the current transaction amount debited from the smart card device account balance.

14. The system of claim 13, wherein the processor is engine further configured to execute instructions stored in the storage device to cause the processor to execute the steps of:

establishing a second network connection with the computer managing the smart card device accounts after completing the offline debit transaction with the smart card device without the network connection to the computer; and transmitting the smart card device account number, the transaction history, and the transaction record to the computer managing the smart card device accounts via the network connection to update the smart card device account managed by the computer managing the smart card device accounts.

15. The system of claim 12, wherein the processor is further configured to execute instructions stored in the storage device to cause the processor to execute the steps of: authorizing a deposit transaction to credit a transaction amount to the smart card device; establish a network connection with the computer managing the smart card device accounts; transmitting to the computer managing the smart card device accounts a deposit request comprising the smart card device account number and an amount of the deposit transaction; receiving from the computer managing the smart card device accounts, a deposit record comprising the amount of the deposit and a sum of deposit; and writing the deposit record to the smart card device transaction history indicating an amount added to the smart card device account balance.

16. The computer-implemented method of claim 1, further comprising storing, by the mobile communication device, the smart card device account number and the transaction history until the mobile communication device has a network connection with the computer managing smart card device accounts.

17. The computer program product of claim 8, further comprising the step of storing the smart card device account number and the transaction history until the mobile communication device has a network connection with the computer managing smart card device accounts.

18. The system of claim 12, wherein the processor is further configured to execute instructions stored in the storage device to cause the processor to execute the step of storing the smart card device account number and the transaction history until a network connection with the computer managing smart card device accounts is established.

* * * * *